US009843662B2

(12) United States Patent
Kim et al.

(10) Patent No.: US 9,843,662 B2
(45) Date of Patent: Dec. 12, 2017

(54) METHOD AND APPARATUS FOR INTERWORKING BETWEEN ELECTRONIC DEVICES

(71) Applicant: Samsung Electronics Co., Ltd., Gyeonggi-do (KR)

(72) Inventors: Joo-Sub Kim, Gyeongsangbuk-do (KR); Chulhyung Yang, Gyeongsangbuk-do (KR); Ji-Woo Lee, Gyeongsangbuk-do (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 3 days.

(21) Appl. No.: 15/070,297

(22) Filed: Mar. 15, 2016

(65) Prior Publication Data

US 2016/0301791 A1 Oct. 13, 2016

(30) Foreign Application Priority Data

Apr. 8, 2015 (KR) ........................ 10-2015-0049767

(51) Int. Cl.
*H04M 11/00* (2006.01)
*H04M 1/725* (2006.01)
*H04W 4/00* (2009.01)
*G04G 9/06* (2006.01)
*G04G 21/04* (2013.01)
*G06F 1/16* (2006.01)

(52) U.S. Cl.
CPC ............ *H04M 1/7253* (2013.01); *G04G 9/06* (2013.01); *G04G 21/04* (2013.01); *G06F 1/163* (2013.01); *H04W 4/003* (2013.01)

(58) Field of Classification Search
CPC ........... H04M 1/7253; H04M 1/72527; H04W 4/003
USPC ...................................... 455/419, 41.1, 41.2
See application file for complete search history.

(56) References Cited

U.S. PATENT DOCUMENTS

| 8,744,528 | B2* | 6/2014 | Kim ........................ G06F 3/017 455/41.1 |
| 2003/0151982 | A1* | 8/2003 | Brewer .................. G04G 21/00 368/46 |
| 2010/0289776 | A1* | 11/2010 | Bryborn Krus ..... G06F 3/03545 345/179 |
| 2013/0304795 | A1* | 11/2013 | Kang ...................... H04L 67/10 709/202 |
| 2014/0160045 | A1 | 6/2014 | Park et al. |

(Continued)

FOREIGN PATENT DOCUMENTS

| KR | 10-2010-0130478 A | 12/2010 |
| KR | 10-1354625 B1 | 1/2014 |

(Continued)

*Primary Examiner* — Charles Shedrick
(74) *Attorney, Agent, or Firm* — Cha & Reiter, LLC

(57) ABSTRACT

An electronic device comprising: a memory; a communication unit for exchanging communications with a wearable device and an external device; and at least one processor that is operatively coupled to the memory, configured to: detect an event that is associated with a connection with the external device; identify a function that is associated with the external device in response to the event; and transmit to the wearable device an instruction for executing the function, wherein the instruction is transmitted via the communications unit.

17 Claims, 13 Drawing Sheets

(56) References Cited

U.S. PATENT DOCUMENTS

2015/0147975 A1* 5/2015 Li .................... H04M 1/7253
 455/41.3
2015/0334772 A1* 11/2015 Wong ............... H04M 1/72569
 455/557

FOREIGN PATENT DOCUMENTS

| KR | 10-2014-0029341 A | 3/2014 |
| KR | 10-2014-0053462 A | 5/2014 |

* cited by examiner

1

METHOD AND APPARATUS FOR INTERWORKING BETWEEN ELECTRONIC DEVICES

CLAIM OF PRIORITY

This application claims the priority under 35 U.S.C. §119(a) to Korean Application Serial No. 10-2015-0049767, which was filed in the Korean Intellectual Attribute Office on Apr. 8, 2015, the entire content of which is hereby incorporated by reference.

TECHNICAL FIELD

The present disclosure relates to electronic devices, in general, and more particularly to a method and apparatus for interworking between electronic devices.

BACKGROUND

With the development of electronic device technology, a wide range of services, which are provided to the user, have rapidly increased. For example, the electronic devices provide a variety of functions, such as web page-browsing, reproducing content, SNS (Social Networking Service) activities, photographing images, or recording videos, which may be performed by the user by using the electronic devices, as well as a phone call function.

In addition, thanks to the development of information and communication technology, general things as well as PCs (personal computer) or smart phones have been used as information communication terminals. In particular, the wearable devices that are information terminals, which are put, or worn, on a user's body, have recently attracted wide attention. Initially, the wearable devices have been developed for a special purpose and have been targeted to a limited market, but now the wearable devices are developed and used in a form that normal consumers use for usual purposes. The wearable device may represent an electronic device that may be put on a user's body. The wearable device does not refer to a mere electronic device that may be put on the user's body, but it may refer to an electronic device that may communicate with the user at the closest position to the user's body. The wearable devices do not need to be held or carried by a hand unlike the current electronic devices (e.g., smart phones, tablet PCs, or the like), and the wearable devices have an improved portability in order to thereby be worn on the user's body or clothing in order to be used.

The wearable device may continue to collect detailed information of the surroundings or a physical change of the user in real time. The wearable device may perform a function of acquiring, storing, and displaying information on its own, such as a clock, an alarm, or recording exercise information. In addition, these days, the wearable device can perform a function by interworking with the electronic device that the same user has rather than a sole function of the wearable device. For example, new user experiences, such as a voice recognition function, a gesture function, or a healthcare function, by making the electronic device and the wearable device interwork with each other.

According to an embodiment, when a phone call function is executed in the electronic device, the wearable device may perform a communication function, such as a sound exchange with the electronic device. Accordingly, the user may make a call through a microphone (MIC) and a speaker (SPK) of the wearable device as if he/she did in the electronic device. Alternatively, the wearable device may: display a numeric keypad; receive a user input, such as a user's touch; and instruct the electronic device to perform the phone call function in response to the user input. Alternatively, when a photographing function is executed in the wearable device through a camera, the wearable device may transmit photographed images to the electronic device in order to thereby enable more convenient shooting compared to the electronic device and in order to thereby compensate for disadvantages that occur due to the miniaturization and the small storage capacity of the wearable device. As described above, the wearable device may provide more extensive user experiences by connecting to, and interworking with, the electronic device compared to the wearable device that is solely used.

SUMMARY

Aspects of the present disclosure are to address at least the above-mentioned problems and/or disadvantages and to provide at least the advantages described below.

Accordingly, an aspect of the present disclosure is to provide a method and an apparatus for making an electronic device, a device, and a wearable device interwork with each other Another aspect of the present disclosure is to provide a method and an apparatus, which may include an electronic device, a device, and a wearable device, and may process an event related to the device by interworking with the wearable device in response to the event due to the device while the electronic device is connected with the wearable device.

Another aspect of the present disclosure is to provide a method and an apparatus in which an electronic device provides a wearable device with an event according to the connection or disconnection of another device other than the wearable device that interworks with the electronic device in order to thereby provide more convenient and wider user experiences to the user.

Another aspect of the present disclosure is to provide a method and an apparatus, which may allow the electronic devices to interwork with each other and may implement an optimal environment for performing the interworking function corresponding thereto in order to thereby improve the user's convenience and the usability of the electronic device.

According to aspects of the disclosure, an electronic device is provided comprising: a memory; a communication unit for exchanging communications with a wearable device and an external device; and at least one processor that is operatively coupled to the memory, configured to: detect an event that is associated with a connection with the external device; identify a function that is associated with the external device in response to the event; and transmit to the wearable device an instruction for executing the function, wherein the instruction is transmitted via the communications unit.

According to aspects of the disclosure, a method is provided for use in an electronic device, comprising: establishing a connection with an external device; detecting an event that is associated with the connection with the external device; identifying a function that is associated with the external device in response to the event; and transmitting to a wearable device an instruction for executing the function.

According to aspects of the disclosure, a method is provided for use in a wearable device, comprising: receiving an instruction from an electronic device; executing a function corresponding to the instruction and displaying a user interface associated with the function; receiving a first input via the user interface; and transmitting a control signal to the electronic device in response to the first input.

According to aspects of the disclosure, a method is provided comprising: establishing a connection between an electronic device and a wearable device; detecting an event associated with the connection; displaying, by the electronic device, a first user interface that is related to a function that matches an external device, and transmitting to the wearable device an instruction for executing the function; displaying, by the wearable device, a second user interface that is related to the function in response to the instruction for executing the function, transmitting, to the electronic device, a control signal corresponding to user input received via the second user interface; and executing, by the electronic device, an operation related to the function in response to the control signal, wherein the operation is executed in cooperation with the external device.

BRIEF DESCRIPTION OF THE DRAWINGS

The above and other aspects, functions, and advantages of the present disclosure will be more apparent from the following detailed description taken in conjunction with the accompanying drawings, in which.

DETAILED DESCRIPTION

Figure 1:
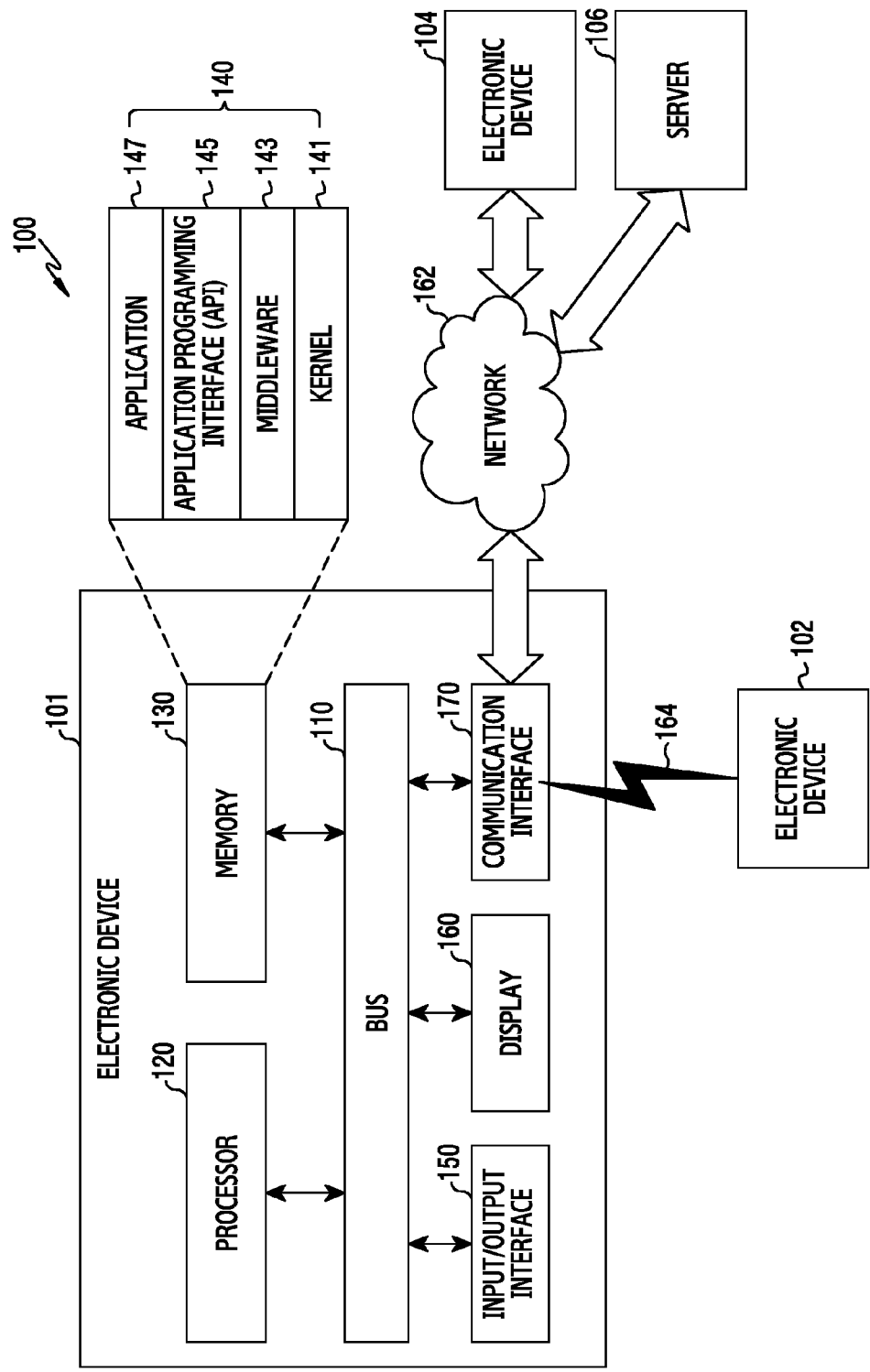
FIG. 1 is a diagram of an example of a network environment that includes an electronic device, according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio-wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram of an example of a network environment that includes an electronic device, according to various embodiments.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. For example, the memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided by the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short-range communication 164. The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
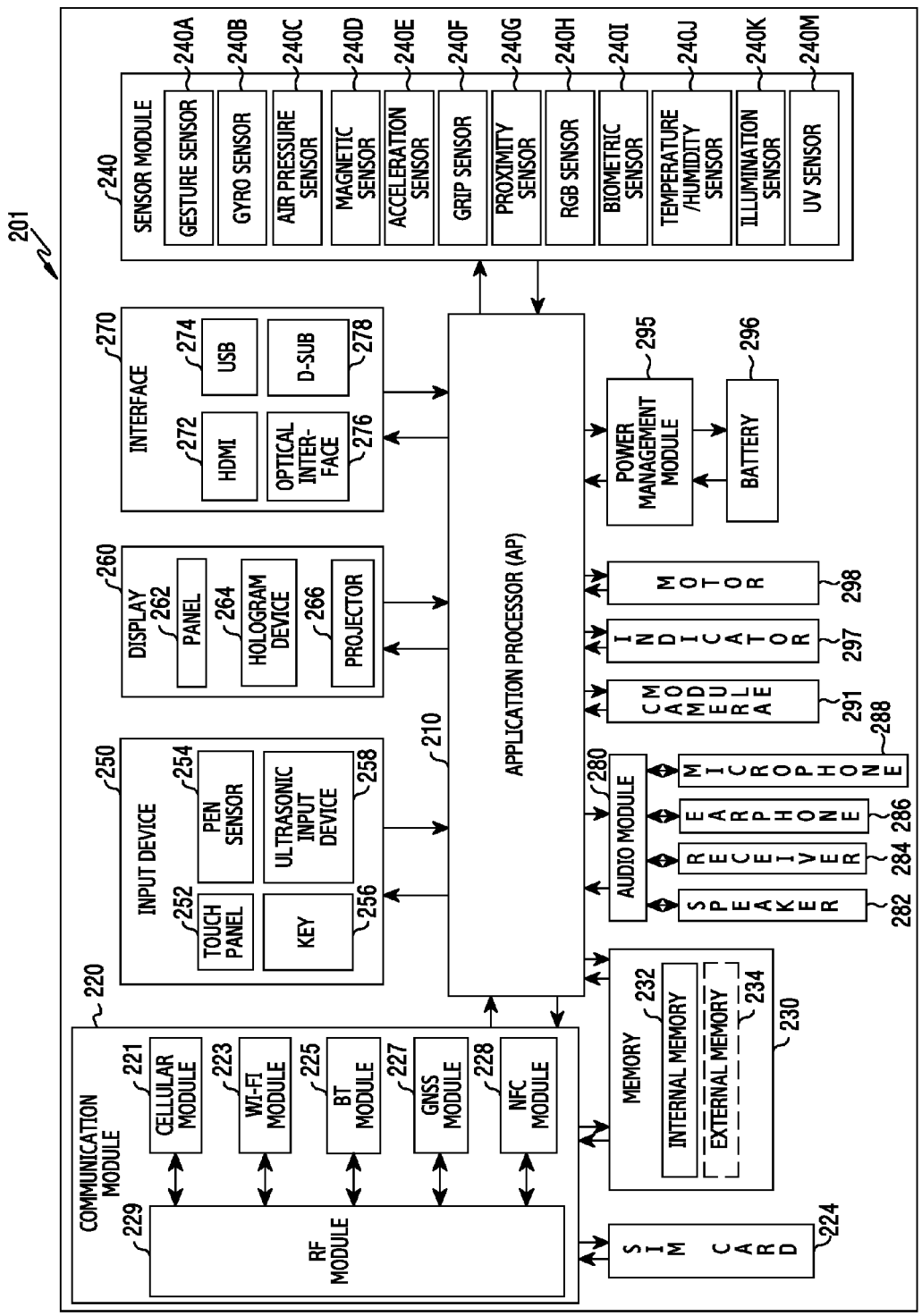
FIG. 2 is a block diagram of an example of an electronic device, according to various embodiments of the present disclosure.

FIG. 2 is a block diagram of an example of an electronic device, according to various embodiments of the present disclosure.

The electronic device 201 may include, for example, all or a part of the electronic device 101 shown in FIG. 1. The electronic device 201 may include one or more processors 210 (e.g., Application Processors (AP)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/ received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 2401, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three-dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, the power supply of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, remaining life battery 296, and voltage, current, or temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
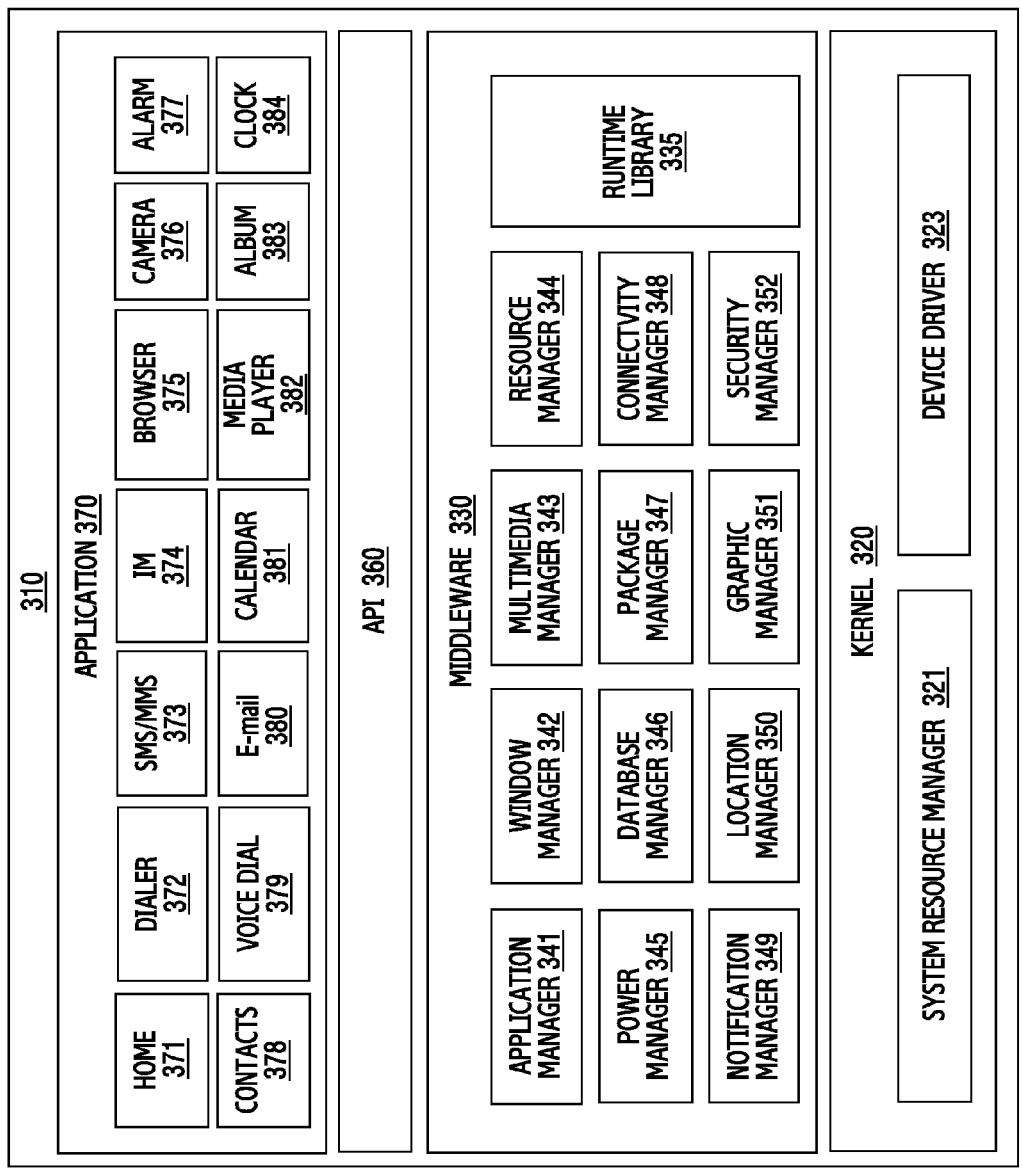
FIG. 3 is a block diagram of an example of a program module, according to various embodiments of the present disclosure.

FIG. 3 is a block diagram of an example of a program module, according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recording media may be, for example, the memory 130.

The computer readable recording medium may include a hard disk, a floppy disk, magnetic media (e.g., a magnetic tape), optical media (e.g., a Compact Disc Read-Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high-class language codes, which can be executed by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above-described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Various proposed embodiments of the present disclosure relate to a method for operating a plurality of electronic devices by the interworking and an electronic device that supports the same. According to various embodiments of the present disclosure, the electronic device may be connected with various external electronic devices (e.g., the wearable device). The electronic device may be connected to, or disconnected from, other external devices (e.g., the device) while the electronic device is connected with the wearable device. In various embodiments of the present disclosure, the electronic device may detect an event by the connection of the device or an event by the disconnection of the device. In various embodiments of the present disclosure, the event by the connection of the device may include an operation or an event (e.g., a pairing event) by which the device is connected to enable the communication. In various embodiments of the present disclosure, the event by the disconnection of the device may include an operation or an event (a pairing release event) in which the device, which has been connected to be able to communicate, is disconnected.

In the following description, the event (e.g., the pairing event) according to the connection may be used as a term that includes an operation or an event, which occurs according to the operation in which the electronic device and the device are connected with (access) each other so that they can communicate with each other. The event (e.g., the pairing release event) according to the disconnection may be used as a term that includes an operation or an event, which occurs according to the operation in which the connection (access) of the electronic device and the wearable device are released so that they cannot communicate with each other.

According to various embodiments of the present disclosure, the electronic device may perform the operation that is related to the corresponding event by interworking with the wearable device that is connected with the electronic device in response to the pairing event or the pairing release event by the device. According to an embodiment, the electronic device may determine an execution method of a function that corresponds to the event in which a specific device is connected or disconnected, and, based on the result of the determination operation, may execute a function for the corresponding event by interworking with the wearable device or may execute the same solely (independently).

In the various embodiments of the present disclosure described below, the electronic device, the wearable device, and the device are separated for convenience of explanation, and the description will be made of the operation in which a function corresponding to the device may be executed by the interworking between the electronic device and the wearable device according to the connection or the disconnection of the device with respect to the electronic device while the electronic device and the wearable device are connected. However, in various embodiments of the present disclosure, the wearable device and the device may belong to the category of the electronic device, and the interworking operation between the electronic devices may be made in various electronic devices as well as the wearable device and the device. For example, in various embodiments of the present disclosure, the electronic device may include all devices, such as all information communication devices, multimedia devices, wearable devices, or application devices thereof, which support the function according to various embodiments of the present disclosure and use one or more of various processors (for example, the processor 120 or 210), such as an AP (application processor), a CP (communication processor), a GPU (Graphic Processing Unit), or a CPU (central processing unit).

In various embodiments of the present disclosure, the electronic device and the wearable device may be connected through a communication interface, and the electronic device may control the wearable device that is connected through the communication interface or may be controlled by the wearable device. In various embodiments of the present disclosure, although the electronic device and the wearable device are representatively described to be wirelessly connected by a wireless communication interface that uses wireless network technology, such as a personal area network (PAN), the electronic device and the wearable device may be connected via a wired communication interface that uses a USB (Universal Serial Bus), a data connector, FireWire, i.Link, or the like. In various embodiments of the present disclosure, the personal area network may represent a network for the communication between various electronic devices (e.g., the wearable device, or other electronic devices) within a communication range of the electronic device, based on short-range communication technology. The short-range communication technology may use at least one of WiFi (Wireless Fidelity), Bluetooth, NFC (near field communication), IrDA (infrared data association), UWB (ultra wideband), ZigBee, an RFID (radio frequency identification), or the like.

In various embodiments of the present disclosure, the electronic device and the wearable device may be connected through a communication interface, and the electronic device may detect a pairing event in which the device is connected to enable the communication through a communication interface or a pairing release event in which the device is disconnected to then be disabled from communicating. In various embodiments of the present disclosure, the electronic device and the device may be connected in a variety of ways depending on the type of device. According to an embodiment, the electronic device and the device may be wirelessly connected by a wireless communication interface that uses wireless network technology, such as a personal area network, or may be connected via a wired communication interface that uses a USB, a data connector, Firewire, i.link, or the like.

Hereinafter, a method, an apparatus, and a system of performing a function according to the interworking between the electronic devices by using an electronic device, a wearable device that is connected to the electronic device, and a device that is connected to, or disconnected from, the electronic device will be described. However, various embodiments of the present disclosure may not be limited to the descriptions provided below and thus, it should be construed that the present disclosure may be applied to various embodiments based on the embodiment provided below.

Hereinafter, various embodiments of the present disclosure will be described from the perspective of hardware. However, various embodiments of the present disclosure include a technology that uses both hardware and software and thus, the various embodiments of the present disclosure may not exclude the perspective of software.

Figure 4:
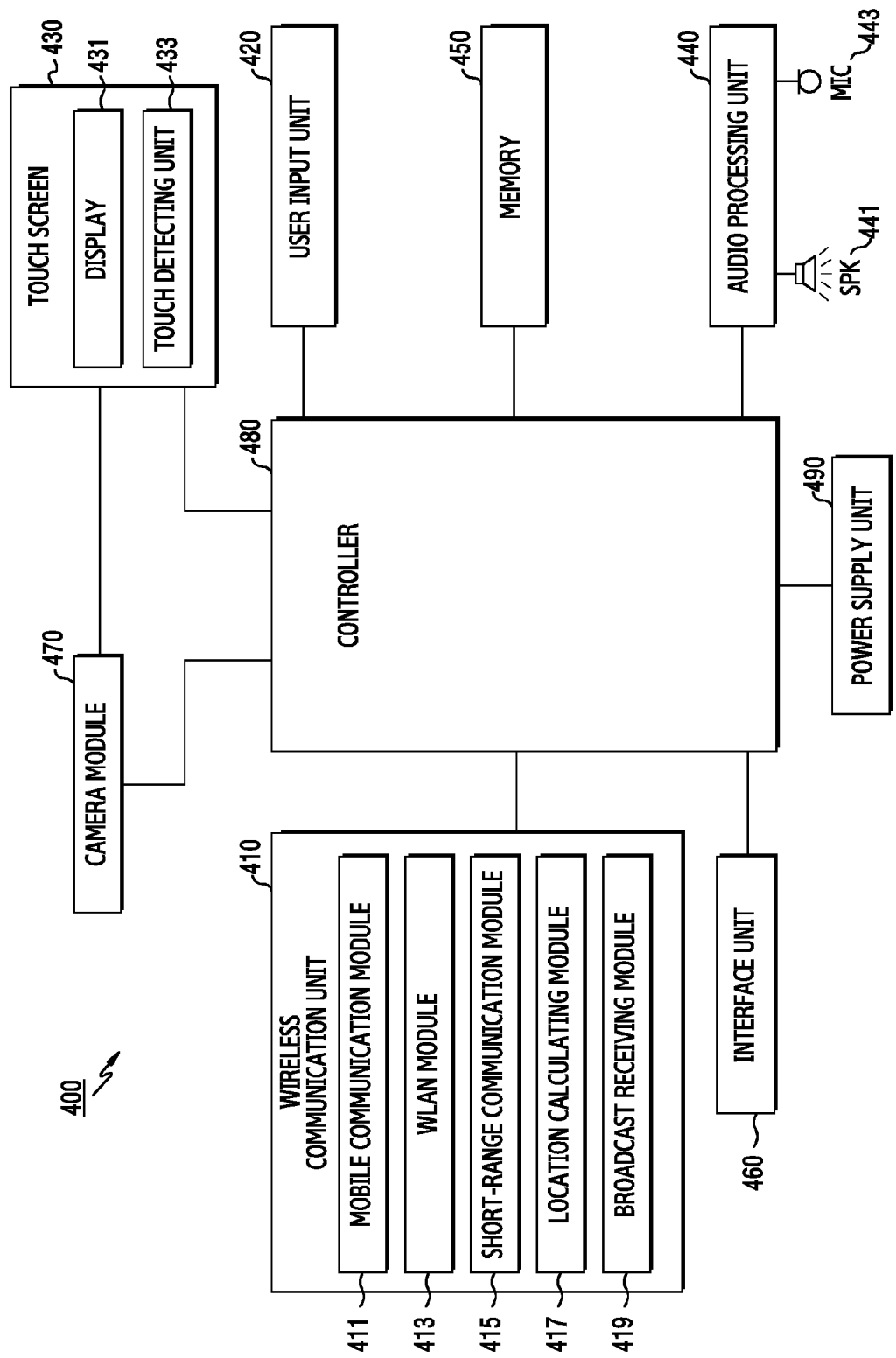
FIG. 4 is a diagram of an example of an electronic device, according to various embodiments of the present disclosure.

FIG. 4 is a diagram of an example of an electronic device, according to various embodiments of the present disclosure.

Referring to FIG. 4, the electronic device 400, according to various embodiments of the present disclosure, may include a wireless communication unit 410, a user input unit 420, a touch screen 430, an audio processing unit 440, a memory 450, an interface unit 460, a camera module 470, a controller 480, and a power supply unit 490. In various embodiments of the present disclosure, the elements that are illustrated in FIG. 4 are not essential for the electronic device 400, so the electronic device 400 may have more elements than FIG. 4, or may exclude some of the elements.

The wireless communication unit 410 may have the same or similar configuration as the communication module 220 of FIG. 2. The wireless communication unit 410 may include one or more modules that enable the wireless communication between the electronic device 400 and a wireless communication system, or between the electronic device 400 and other electronic devices (e.g., the electronic device 102 or 104, or the server 106). For example, the wireless communication unit 410 may be configured to include a mobile communication module 411, a WLAN (wireless local area network) module 413, a short-range communication module 415, a location calculating module 417, and a broadcast receiving module 419. In various embodiments of the present disclosure, the wireless communication unit 410 may perform wireless communication with the wearable device on the basis of a configured communication scheme.

The mobile communication module 411 may transmit/receive wireless signals to/from at least one of a base station, external electronic devices (e.g., the electronic device 104), or a variety of servers (e.g., an integration server, a provider server, a content server, an internet server, a cloud server, or the like) through a mobile communication network. The wireless signals may include various types of pieces of data according to a voice call signal, a video call signal, or the transmission and reception of text/multimedia messages.

The mobile communication module 411 may receive one or more pieces of data (e.g., content, messages, e-mails, images, videos, weather information, location information, time information, or the like). According to an embodiment, the mobile communication module 411 may be connected with one or more other electronic devices (e.g., the electronic device 104 or the server 106), which are connected with the electronic device 400 through a network (e.g., the mobile communication network) in order to thereby obtain (receive) a variety of data. The mobile communication module 411 may transmit a variety of data, which is necessary for the operation of the electronic device 400, to the outside (e.g., the server 106 or another electronic device 104) in response to a user's request.

The mobile communication module 411 may perform a communication function. For example, the mobile communication module 411 may transform an RF (radio frequency) signal into a baseband signal to then be provided to the controller 480, or may transform the baseband signal received from the controller 480 into an RF signal to then be transmitted, under the control of the controller 480. Here, the controller 480 may process the baseband signal based on various communication schemes. For example, the communication schemes may include a GSM (global system for mobile communication) communication scheme, an EDGE (enhanced data GSM environment) communication scheme, a CDMA (code division multiple access) communication scheme, a W-CDMA (w-code division multiple access) communication scheme, an LTE (long term evolution) communication scheme, or an OFDMA (orthogonal frequency division multiple access) communication scheme, but the communication schemes are not limited thereto.

The WLAN module 413 may refer to a module to form a wireless LAN link between a wireless Internet access and other electronic devices (e.g., the electronic device 102 or the server 106). The WLAN module 413 may be provided inside or outside the electronic device 400. The wireless Internet technology may use a wireless LAN (WiFi, wireless fidelity), WiBro (wireless broadband), WiMax (world interoperability for microwave access), HSDPA (High-Speed Downlink Packet Access), or mmWave (millimeter wave).

The WLAN module 413 may transmit one or more pieces of data selected by the user to the outside, or may receive the same from the outside. According to an embodiment, the WLAN module 413 may interwork with at least one of another electronic device (for example, the wearable device) or a server, which is connected to the electronic device 400 through a network (e.g., the wireless Internet network) in order to thereby transmit a variety of data of the electronic device 400 to the outside (e.g., the wearable device, another electronic device, or server), or in order to thereby receive the same from the outside. The WLAN module 413 may be normally maintained to be in the on-state, or may be turned on according to the configuration of the electronic device 400 or a user input.

The short-range communication module 415 may represent a module that performs short-range communication. The short-range communication technology may use Bluetooth, low power Bluetooth (BLE), an RFID (Radio Frequency Identification), infrared data association (IrDA), UWB (Ultra Wideband), ZigBee, or NFC (near field communication).

The short-range communication module 415 may receive one or more pieces of data. According to an embodiment, the short-range communication module 415 may interwork with other electronic devices (for example, the wearable device or the device), which are connected with the electronic device 400 through a network (e.g., the short-range communication network), in order to thereby transmit or receive a variety of data of the electronic device 400 to or from other electronic devices. The short-range communication module 415 may be normally maintained to be in the on-state, or may be turned on according to the configuration of the electronic device 400 or a user input.

The location calculating module 417 refers to a module for obtaining the location of the electronic device 400, and may include a GPS (global position system) module as a typical example. The location calculating module 415 may measure the location of the electronic device 400 by using a triangulation method. For example, the location calculating module 417 may calculate distance information from three or more base stations and time information, and may calculate current location information in three dimensions according to latitude, longitude, and altitude by applying triangulation to the calculated information. Alternatively, the location calculating module 417 may continue to receive the location information of the electronic device 400 from three or more satellites in real time in order to thereby calculate the location information. The location information of the electronic device 400 may be obtained in various manners.

The broadcast receiving module 419 may receive broadcast signals (e.g., a TV broadcast signal, a radio broadcast signal, a data broadcast signal, or the like) and/or broadcast-related information (e.g., broadcast channels, broadcast programs, or information on a broadcast service provider) from an external broadcast management server through a broadcast channel (e.g., a satellite broadcast channel, a terrestrial broadcast channel, or the like).

The user input unit 420 may create input data for controlling the operation of the electronic device 400 in response to a user input. The user input unit 420 may include one or more input means for detecting various user inputs. For example, the user input unit 420 may include a keypad, a dome switch, physical buttons, a touch pad (a pressure-sensitive/capacitive type), a jog & shuttle, sensors (e.g., the sensor module 240), or the like.

Some of the user input unit 420 may be implemented as buttons on the outside of the electronic device 400, and some or all of the user input unit 420 may be implemented as a touch panel. The user input unit 420 may receive a user input for initiating the operation of the electronic device 400, according to various embodiments of the present disclosure, and may generate an input signal according to the user input. For example, the user input unit 420 may receive various user inputs to perform a connection of the wearable device, photographing images, the execution of applications, the data input (writing or inserting), the posture change of the electronic device 400, the display of content, the transmission or reception of data, or the like, and may generate input signals according to the user inputs.

The touch screen 430 may represent input and output means for performing an input function and a displaying function at the same time, and may include a display 431 (e.g., the display 160 or 260) and a touch detecting unit 433.

The touch screen 430 may: provide an input/output interface between the electronic device 400 and the user; transfer a user's touch input to the electronic device 400; or play an intermediary role to display the output from the electronic device 400 to the user. The touch screen 430 may provide the user with a visual output. The visual output may be formed of text, graphics, videos, or a combination thereof. For example, in the embodiment of the present disclosure, the touch screen 430 may display various screens according to the operation of the electronic device 400 through the display 431. The various screens, for example, may include various user interface (UI)-based screens that can be displayed to correspond to the executed applications, such as, a messenger screen, a phone call screen, a game screen, a video reproduction screen, a gallery screen, a web page screen, a home screen, or a network connection screen.

The touch screen 430 may detect one or more events (e.g., a touch event, a hovering event, or an air gesture event), which are based at least one of a touch, hovering, or an air gesture of the user through the touch detecting unit 433 while a specific screen is displayed on the display 431, and may transfer an input signal according to the event to the controller 480. The controller 480 may identify the transferred events, and may control the operation corresponding to the identified event.

According to various embodiments of the present disclosure, the display 431 may display (output) a variety of information that is processed in the electronic device 400. For example, the display 431 may display a user interface (UI) or a graphic user interface (GUI), which is related to a phone call, while the electronic device 400 is in a phone call mode. In addition, the display 431 may display a UI or a GUI, which is related to photographed and/or received images and the corresponding mode operation while the electronic device 400 is in a video call mode or in a photographing mode. The display 431 may display data or content, which is related to the usage of the electronic device 400, or information on other electronic devices (e.g., the wearable device or the device), which are connected to the network. The display 431 may display various application execution screens corresponding to the executed applications.

The display 431 may support the display in a horizontal mode or the display in a vertical mode according to the rotation direction (or lying direction) of the electronic device 400, or the display according to the switch between the horizontal mode and the vertical mode. The display 431 may use various displays (e.g., the display 160). Some displays may be implemented as a transparent display that is configured to be a transparent type or an optical transparent type.

The touch detecting unit 433 may be placed on the display 431, and may detect a user input that touches or approaches the surface of the touch screen 430. The user input may include a touch event or a proximity event, which is input based on at least one of a single-touch, a multi-touch, hovering, or an air gesture. For example, the user input may be input by tapping, dragging, sweeping, flicking, drag & drop, or drawing gestures (e.g., handwriting). The touch detecting unit 433 may detect a user input (e.g., the touch event or the proximity event) on the surface of the touch screen 430, and may generate a signal corresponding to the detected user input to then be transmitted to the controller 480. The controller 480 may control the function execution corresponding to the area where the user input (e.g., the touch event or the proximity event) occurs by a signal transmitted by the touch detecting unit 433.

In various embodiments of the present disclosure, the touch detecting unit 433 may receive a user input for initiating an operation related to the use of the electronic device 400, and may generate an input signal according to the user input. The touch detecting unit 433 may be configured to convert a change in the pressure that is applied to a specific portion of the display 431 or a capacitance that occurs in a specific portion of the display 431 into an electric input signal. The touch detecting unit 433 may detect the position and the area where the input means (e.g., user's fingers, an electronic pen, or the like) touch or approach the surface of the display 431. In addition, the touch detecting unit 433 may be implemented to detect the pressure of the touch according to the type of applied touch as well. If the touch detecting unit 433 receives a touch or a proximity input, the signal(s) corresponding thereto may be transmitted to a touch screen controller (not shown). The touch screen controller (not shown) may process the signal(s), and then may transfer corresponding data to the controller 480. Thus, the controller 480 may identify the area where the touch or proximity has occurred on the touch screen 430, and may execute a function corresponding thereto.

The audio processing unit 440 may have the same or similar configuration as the audio module 280 of FIG. 2. The audio processing unit 440 may perform a function of transmitting audio signals received from the controller 480 to a speaker (SPK) 441 and transmitting audio signals, such as voice, received from a microphone (MIC) 443 to the controller 480. The audio processing unit 440 may convert voice/sound data into an audible sound to then be output through the speaker 441 according to the control of the controller 480, and may convert an audio signal, such as voice, received from the microphone 443 into a digital signal to then be delivered to the controller 480. The audio processing unit 440 may output an audio signal in response to a user input according to audio processing information (e.g., sound effects, music files, etc.) contained in the data.

The speaker 441 may output audio data that is received from the wireless communication unit 410 or is stored in the memory 450. The speaker 441 may output an audio signal that is related to various operations (functions), which are executed in the electronic device 400. The speaker 441 may play the role of making an output of an audio stream, such as voice recognition, voice replication, digital recording, or a phone call function. Although it is not shown in the various embodiments of the present disclosure, the speaker 441 may include earphones, headphones, or a headset, which are attachable and detachable, and may be connected with the electronic device 400 through an external port.

The microphone 443 may receive external sound signals to process the same into electrical voice data. The voice data processed through the microphone 443 may be converted into a form that can be transmitted to the outside through the mobile communication module 411 while the electronic device 400 is in a phone call mode. The microphone 443 may be implemented to have a variety of noise reduction algorithms for removing noise that is generated in the course of receiving the external sound signal. The microphone 443 may play the role of making an input of an audio stream, such as a voice instruction (e.g., a voice instruction for initiating the connection operation of the electronic device 400 and the wearable device), voice recognition, digital recording, or a phone call function. For example, the microphone 443 may convert sound signals into electrical signals. According to various embodiments of the present disclosure, the microphone 443 may include an internal microphone that is built in the electronic device 400 and an external microphone that is connected to the electronic device 400.

The memory 450 (e.g., the memory 130 or 230) may store one or more programs that are executed by the controller 480, and may perform a function of temporarily storing the input/output data. The input/output data may include, for example, content, messenger data (e.g., chat data), contact information (e.g., the wired or wireless phone number), messages, media files (e.g., audio files, video files, images file, etc.), or the like.

The memory 450 may store one or more programs and data, which are related to the execution of a function by the interworking between the electronic device 400 and the wearable device according to an event (e.g., the pairing event or the pairing release event), which is created by the device. For example, in various embodiments of the present disclosure, the memory 450 may store one or more programs that perform the operations of: detecting the connection or disconnection of the device; determining the type of device that is connected or disconnected; identifying a user interface related to a wearable device that matches the determined device; determining an execution method of a function corresponding to an event that is detected according to whether or not the user interface exists; and displaying the user interface based on the result of the determination operation and solely executing the corresponding function, or transmitting a function-executing instruction (a user interface executing instruction) to the wearable device and executing the function by interworking with the wearable device, and the data that is processed according thereto.

The memory 450 may store the frequency of use (e.g., the frequency of the wearable device connection, the frequency of using the device, the frequency of the device connection, the frequency of using the application, the frequency of using content, or the like), the importance, and the priority according to the operation of the electronic device 400 as well. The memory 450 may store data on vibrations and sounds in various patterns, which are output in response to a touch input or a proximity input on the touch screen 430. The memory 450 may continuously or temporarily store an operating system (OS) of the electronic device 400, programs that are related to the input and the display control by using the touch screen 430, programs that are related to the control of various operations (functions) of the electronic device 400, and a variety of data that is generated by the operation of each program.

The memory 450 (e.g., the memory 130 or 230) may include an extended memory (e.g., the external memory 234) or an internal memory (e.g., the internal memory 232). The electronic device 400 may operate in association with a web storage that performs a storage function of the memory 450 on the internet.

The memory 450 may store a variety of software. For example, the software components may include an operating system software module, a communication software module, a graphic software module, a user interface software module, an MPEG (Moving Picture Experts Group) module, a camera software module, or one or more application software modules. In addition, the module, which is a software component, may be expressed as a group of instructions, so the module may be referred to as a set of instructions. The module may be expressed as a program as well. In various embodiments of the present disclosure, the memory 450 may include additional modules (instructions) in addition to the modules described above. Alternatively, if necessary, some of the modules (instructions) may not be used.

The operating system software module may include a plurality of software components to control the general system operation. The control of the general system operation, for example, may refer to the management and control of the memory, the management and control of storage hardware (the device), and the management and control of power. In addition, the operating system software module may perform a function to facilitate communication between a variety of hardware (devices) and software components (modules) as well.

The communication software module may enable the communication with other electronic devices, such as a wearable device, a device, a computer, a server, or a mobile terminal, through the wireless communication unit 410 or the interface unit 460. In addition, the communication software module may be configured as a protocol structure corresponding to its communication scheme.

The graphic software module may include a number of software components for providing and displaying graphics on the touch screen 430. The term "graphics" may be used to have a meaning that includes text, web pages, icons, digital images, videos, animations, or the like.

The user interface software module may include various software components that are related to the user interface (UI). For example, the user interface software module may include the change status of the user interface or a condition on which the status of the user interface is changed.

The MPEG module may include software components that enable digital content-related (e.g., video related or audio related) processes and functions (e.g., the creation, reproduction, distribution, and transmission of the content).

The camera software module may include camera-related software components that enable the camera-related processes and functions.

The application modules may include a web browser containing a rendering engine, e-mail, instant messaging, word processing, keyboard emulation, an address book, a touch list, widget, digital right management (DRM), voice recognition, a position determining function, location-based services, or the like. According to various embodiments of the disclosure, the application module may include instructions for configuring the connection with the wearable device. For example, the application module may provide an event that is related to the device while the electronic device 400 is connected to the wearable device, and may allow the electronic device 400 and the wearable device to interwork with each other to perform the function in response to the event.

The interface unit 460 may have the same or similar configuration as the interface 270 of FIG. 2. The interface unit 460 may play the role of an interface with respect to all of external other electronic devices connected to the electronic device 400. The interface unit 460 may: receive data from the external other electronic devices; receive power to transfer the same to the elements of the electronic device 400; or allow the data in the electronic device 400 to be transmitted to external other electronic devices. For example, the interface unit 460 may include a wired/wireless headset port, an external charger port, a wired/wireless data port, a memory card port, a port to be connected to a device that adopts an identification module, audio input/output ports, video input/output ports, an earphone port, or the like. According to various embodiments of the present disclosure, the interface unit 460 may communicate with the device in order to thereby exchange a variety of data (e.g., a control signal by a device, a response signal by the electronic device 400, a video signal, an audio signal, files, or the like) while the electronic device 400 and the device are connected with each other for communication.

The camera module 470 (e.g., the camera module 291) represents a configuration that supports a photographing function of the electronic device 400. The camera module 470 is able to support the photographing of images (still images or moving images) for an object. The camera module 470 may photograph a certain object and may transmit the photographed data to the display 431 and the controller 480, under the control of the controller 480. The camera module 470 may be configured to include an image sensor (or a camera sensor) (not shown), which converts an optical input signal into an electric signal, and an image signal processor (not shown), which converts the electric signal received from the image sensor into digital image data. The image sensor may include a sensor that uses a CCD (charge coupled device) or a CMOS (complementary metal-oxide-semiconductor). Additionally or alternatively, the camera module 470, for example, may include a color sensor that senses the wavelength of light radiated or reflected by an object to identify colors. The camera module 470 may support an image processing function for supporting the shooting according to a variety of shooting options (for example, zooming, aspect ratio, effects (e.g., sketch, mono, sepia, vintage, mosaic, frame, etc.)) by the configuration of the user.

The controller 480 may control the overall operation of the electronic device 400. For example, the controller 480 may perform the control related to voice communication, data communication, or video communication. The controller 480 may include one or more processors (e.g., the processor 210), or may be referred to as a processor. For example, the controller 480 may include, as separate elements, a communications processor (CP), an application processor (AP), an interface {e.g., GPIO (general purpose input/output)}, or an internal memory, or the elements may be integrated into one or more integrated circuits. The application processor may execute various software programs to perform a number of functions for the electronic device 400, and the communication processor may perform the processing and control for voice communication and data communication. In addition, the controller 480 may execute a specific software module (a set of instructions) stored in the memory 450 in order to thereby perform a variety of functions corresponding to the specific module.

According to various embodiments of the present disclosure, the controller 480 may control the interworking between the electronic devices (e.g., the electronic device 400, the wearable device, or the device) and the operation of performing various functions according to the interworking. For example, the controller 480 may configure the connection between the electronic device 400 and the wearable device. The controller 480 may detect events generated by the device while the electronic device 400 is connected to the wearable device. For example, the controller 480 may detect a pairing event corresponding to the connection of the device or a pairing release event corresponding to the disconnection of the device. The controller 480 may determine the type of device to be connected or disconnected in response to detecting the event due to the device, and may identify a function or a dedicated user interface, which is related to the wearable device that matches the determined device.

According to various embodiments, the controller 480 may determine an execution method of the function corresponding to the detected event depending on whether or not the function or the user interface exists. For example, if the function related to the wearable device that matches the device exists, the controller 480 may determine that the function corresponding to the event is to be executed by the interworking with the wearable device. In addition, if the function related to the wearable device that matches the device does not exist, the controller 480 may determine that the function corresponding to the event is to be executed solely (independently) by the electronic device 400.

According to various embodiments, the controller 480 may display a user interface (e.g., the first user interface) based on the result of the determination operation, and may control the sole operation of the function by the electronic device 400. In addition, the controller 480 may transmit a function-executing instruction (or a second user interface executing instruction) to the wearable device based on the result of the determination operation, and may control the function operation by the interworking with the wearable device.

According to various embodiments of the present disclosure, the controller 480 may: connect the wearable device based on wired or wireless communication; transmit, to the wearable device, function control instructions (e.g., a function-executing instruction or a function-end instruction) corresponding to the event of the connection to the electronic device through wired or wireless communication or the disconnection therefrom; and control the related function execution in response to a user input (e.g., a gesture input) from the wearable device.

According to various embodiments of the present disclosure, the controller 480 may interwork with the software modules stored in the memory 450 in order to thereby perform the interworking functions of the electronic device 400 described above, according to various embodiments. In addition, according to various embodiments of the present disclosure, the controller 480 may be implemented by one or more modules to process the interworking functions of the electronic devices mentioned above. In addition, according to various embodiments of the present disclosure, the controller 480 may be implemented by one or more processors that execute one or more programs stored in the memory 450 in order to thereby control the operation (for example, the interworking of the electronic device 400, the device 500, and the wearable device 600, and a function execution operation according to the interworking) of the electronic device 400, according to various embodiments of the present disclosure.

The controller 480, according to various embodiments of the present disclosure, may control various operations related to normal functions of the electronic device 400, as well as the functions above. For example, when a specific application is executed, the controller 480 may control the operation and display of the application. In addition, the controller 480 may receive input signals corresponding to a variety of touch event inputs or proximity event inputs, which are supported by the touch-based or proximity-based input interface (e.g., the touch screen 430), and may control the function operation according thereto. In addition, the controller 480 may control the transmission and reception of a variety of data based on wired communication or wireless communication.

The power supply unit 490, under the control of the controller 480, may receive power from an internal power source or an external power source in order to thereby supply the power necessary for the operation of each element. In various embodiments of the present disclosure, one or more processors of the controller 480, the display 431, or the wireless communication unit 410 may be powered on and off by the power supply unit 490 under the control of the controller 480.

Various embodiments described in the present disclosure may be implemented in a computer (or similar device)-readable recording medium using software, hardware or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electrical units for performing other functions.

In various embodiments of the present disclosure, the recording medium may include a computer-readable recording medium that records a program to execute the operations of: detecting an event in response to the connection of a device while being connected to a wearable device; determining a user interface dedicated to the wearable device, which matches the device related to the event; determining a function execution method according to whether or not the user interface exists; and independently executing the function or executing the function by interworking with the wearable device based on a result of the determination operation.

In some cases, the embodiments described herein may be implemented by the controller 480 itself. Furthermore, according to the software implementation, the embodiments such as procedures and functions described in the present specification may also be implemented as separate software modules. The software modules may perform one or more functions and operations described in the present specification.

According to various embodiments of the present disclosure, at least some of the functions that are executed by the electronic device 400 may be performed by the external device (e.g., the server 106 or the wearable device). For example, the server 106 may: include a processing module corresponding to the controller 480; process at least some of the functions related to the interworking between the electronic device 400 and other electronic devices and the control of the function execution according thereto by using the processing module, based on at least some of the information transmitted from the electronic device 400; and transmit the result thereof to the electronic device 400.

As described above, the electronic device 400, according to various embodiments of the present disclosure, may include: a communication unit (e.g., the WLAN module 413, the short-range communication module 415, the interface unit 460, or the like) that performs the connection with the wearable device 600 and the external device 500; and a processor (e.g., the controller 480) that is functionally connected with the communication unit and that detects an event that is related to the connection of the external device 500 while being connected with the wearable device 600, determines a function that matches the external device 500, which is related to the event, and transmits an executing instruction for executing the function to the wearable device 600.

According to various embodiments, the communication unit may include a communication module that supports a communication connection with the wearable device or the external device, respectively, based on wired or wireless communication. In various embodiments, the event includes an event in which the electronic device is connected with the external device to be communicable.

According to various embodiments, the wearable device may include a device that is able to be connected with the electronic device through a communication interface based on wired or wireless communication, and the external device may include an electronic pen, earphones, a charger, a display device, or another electronic device, which can be connected with the electronic device through a communication interface based on wired or wireless communication.

According to various embodiments, the processor may control the execution of the function that is related to a control signal received from the wearable device. According to various embodiments, the processor may determine whether or not a function of the wearable device, which matches the type of external device, exists, and if the function of the wearable device does not exist, may provide the wearable device with information by which a function, which can be executed by the interworking with the device, may be obtained.

According to various embodiments, the processor may: determine whether or not a function of the wearable device, which matches the type of external device, exists; if the function of the wearable device exists, display the first user interface that is related to the function; transmit, to the wearable device, an executing instruction for the function or the second user interface that is related to the function; and execute an operation that is related to the function in response to a control signal of the wearable device based on the second user interface.

According to various embodiments, the first user interface and the second user interface may include configurations that are related to the function, and the second user interface may be provided based on at least some of the configurations that are implemented in the first user interface. According to various embodiments, the processor may detect an event by the disconnection of the external device while being connected with the wearable device, and to transmit an end instruction for ending the function related to the event to the wearable device.

As described above, the electronic device 400, according to various embodiments of the present disclosure, may include: a communication unit (e.g., the WLAN module 413, the short-range communication module 415, the interface unit 460, or the like) that performs the connection with other electronic devices (e.g., the wearable device 600 or the external device 500); and a controller 480 that, while being connected with the first electronic device (e.g., the wearable device), detects an event due to the connection of the second electronic device (e.g., the device), determines a function that matches the second electronic device, which is related to the event, and transmits, to the first electronic device, an executing instruction for executing the function in the first electronic device.

Figure 5:
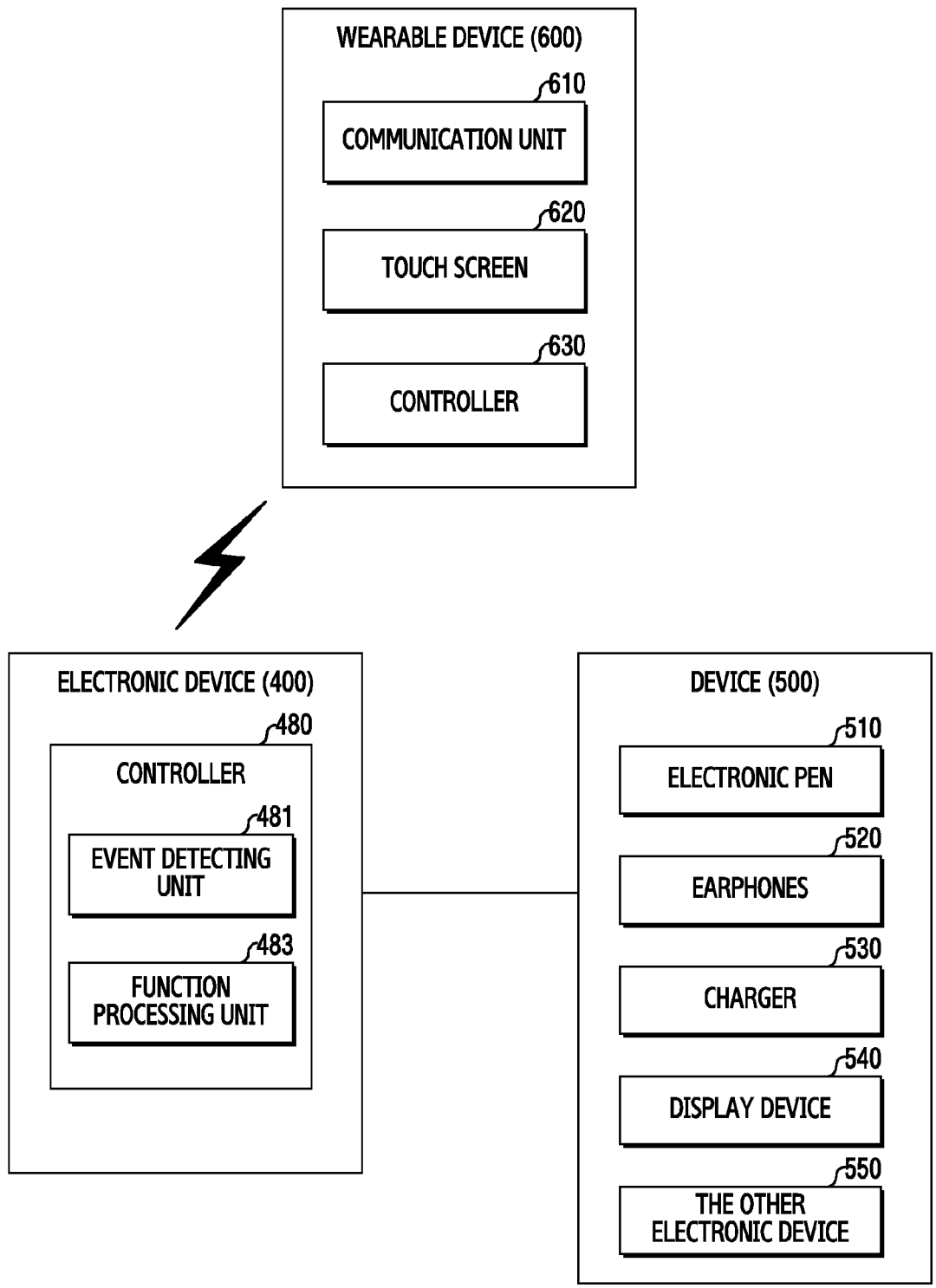
FIG. 5 is a diagram of an example of a system, according to various embodiments of the present disclosure.

FIG. 5 is a diagram of an example of a system, according to various embodiments of the present disclosure. As illustrated, the system includes an electronic device 400, a device 500, and a wearable device 600.

As shown in FIG. 5, the electronic device 400, for example, may include at least some of the elements of the electronic device shown in FIG. 4, and may be the same as, or different from, the electronic device 400 of FIG. 4. In various embodiments of the present disclosure, the electronic device 400 may be connected with the wearable device 600 through a communication interface (e.g., the WLAN module 413, the short-range communication module 415, and the interface unit 460 of FIG. 4). The communication interface may include at least one of a wired communication interface and a wireless communication interface. In addition, the electronic device 400 may be connected with the device 500 through communication interface (e.g., the WLAN module 413, the short-range communication module 415, and the interface unit 460 of FIG. 4).

The device 500 may be connected with the electronic device 400 through a communication interface (e.g., a wired or wireless communication interface). In various embodiments of the present disclosure, the device 500, for example, may include an electronic pen 510, earphones 520, a charger 530, a display device 540, or the other electronic device 550, but the device is not limited thereto and may include various types of devices that can be connected with the electronic device 400.

The wearable device 600 may be connected with the electronic device 400 through a communication interface (e.g., a wired or wireless communication interface). In various embodiments of the present disclosure, the wearable device 600 may represent a device that can be put on the body of the user. For example, the wearable device may include a wrist-watch type of device that can be worn on the wrist or a device in the form of glasses, which can be worn around the eyes, and may represent a device that may provide a variety of functions by interworking with the electronic device 400.

In various embodiments of the present disclosure, the wearable device 600 may include a communication unit 610, a touch screen 620, and a controller 630.

In various embodiments, the communication unit 610 of the wearable device 600 may include a communication interface for connecting to the electronic device 400, and may transmit and receive data from the electronic device 400 and the wearable device 600. In various embodiments, the touch screen 620 of the wearable device 600 may include a component (e.g., a touch detecting unit) for receiving an input from the user, and may receive a touch or proximity type of input from the user to then be transmitted to the controller 630. The touch screen 620 may include a component (e.g., the display) for displaying output-related data transmitted from the controller 630 to the user. In various embodiments, the controller 630 of the wearable device 600 may control the overall operations of the wearable device 600. For example, the controller 630 may control to transfer the data from the electronic device 400, which is received from the communication unit 610, to the touch screen 620 to then display the same, or may include a component for generating a function control signal corresponding to the user input received through the touch screen 620 and transmits the same to the electronic device 400 through the communication unit 610.

In various embodiments of the present disclosure, the electronic device 400 and the wearable device 600 may be connected to each other in a well-known manner. According to an embodiment, the electronic device 400 may be connected with the wearable device 600 according to a communication interface based on the wireless communication, such as the WLAN module 413 or the short-range communication module 415, or may be connected with the wearable device 600 based on the wired communication through the interface unit 460.

In various embodiments of the present disclosure, the electronic device 400 may be connected to the device 500 in a well-known manner. According to various embodiments, if the device 500 is an electronic pen 510, the electronic pen 510 may be mounted (inserted) into a hole (not shown) provided in the electronic device 400. When the electronic pen 510 is removed from the hole, the electronic device 400 may detect a pairing event due to the electronic pen 510, and may be connected with the electronic pen 510 in a well-known manner in order to thereby communicate with the same (e.g., data communication). When the electronic pen 510 is mounted (inserted) in the hole, the electronic device 400 may detect a pairing release event due to the electronic pen 510, and the connection with the electronic pen 510 may be released in a well-known manner.

According to various embodiments of the present disclosure, if the device 500 is the earphones 520, the earphones 520 may be connected to an earphone connector (or port) (not shown) provided in the electronic device 400 through an earphone jack. When the earphones 520 are connected to the earphone connector, the electronic device 400 may detect a pairing event by the earphones 520 and begin communicating with the earphones 520 in a well-known manner. When the earphones 520 are detached (separated) from the earphone connector, the electronic device 400 may detect a pairing release event due to the earphones 520, and the connection with the earphones 520 may be released.

According to various embodiments, if the device 500 is the charger 530, the charger 530 may be connected to a data connector (or a charging port) (not shown) provided in the electronic device 400 through a data cable. When the charger 530 is connected to the data connector, the electronic device 400 may detect a pairing event due to the charger 530 in order to thereby perform the communication (e.g., a charging operation) with the charger 530. When the charger 530 is detached (separated) from the data connector, the electronic device 400 may detect a pairing release event due to the charger 530, and the connection with the charger 530 may be released, thereby completing the charging operation.

According to various embodiments, if the device 500 is the display device 540, the display device 540 may be connected to the electronic device 400 via a USB or HDMI connection, or may be connected to the electronic device 400 via a wireless connection (e.g., short-range connection). When the display device 540 accesses the electronic device 400 based on wired or wireless communication, the electronic device 400 may detect a pairing event due to the display device 540, and may be connected with the display device 540 in order to perform the communication (e.g., an external output or multi-screen operation, a mirroring operation, or the like). When the connection with the display device 540 is released, the electronic device 400 may detect a pairing release event due to the display device 540, and may be disconnected from the display device 540.

According to various embodiments of the present disclosure, if the device 500 is the other electronic device 550, the other electronic device 550 may be connected to the electronic device 400 via a wired or wireless connection. When the other electronic device 550 is connected to the electronic device 400 based on wired or wireless communication, the electronic device 400 may detect a pairing event due to the other electronic device 550, and may be connected with the other electronic device 550 to perform the communication (e.g., the data transmission and reception or a phone call operation). When the connection of the other electronic device 550 through wired or wireless communication is released, the electronic device 400 may detect a pairing release event due to the other electronic device 550 and may be disconnected from the other electronic device 550 to then end the related operation.

Referring to FIG. 5, according to various embodiments of the present disclosure, the electronic device 400 and the wearable device 600 may be connected to each other. For example, the electronic device 400 and the wearable device 600 may perform a connecting operation (e.g., a pairing process) such that the electronic device 400 and the wearable device 600 may interwork with each other through a communication scheme, such as WiFi-Direct, Bluetooth, NFC, or the like. The electronic device 400 and the wearable device 600 may interwork with each other in accordance with the execution of the connecting operation, and they may share with each other data that is obtained in real-time.

When the electronic device 400 and the wearable device 600 are connected with each other, the controller 480 may detect events generated by the device 500. In various embodiments of the present disclosure, the events may include a pairing event in which the device 500 is connected to the electronic device 400 and a pairing release event in which the device 500 is disconnected from the electronic device 400 to then be disabled from communicating. For example, the device 500 may be connected to the electronic device 400 by using the communication interface, which is supported by the device 500, among a variety of communication interfaces, as described above. The controller 480 may detect when the electronic device 400 is connected or disconnected from the device 500 by using the event detecting unit 481. In various embodiments of the present disclosure, the event detecting unit 481 may detect the change status for the connection or disconnection of the device 500 in at least one of a variety of communication interfaces that are available in the electronic device 400.

According to various embodiments, the electronic device 400 may detect the connection and disconnection of the device 500 while the electronic device 400 and the wearable device 600 interwork with each other according to the completion of the connection (e.g., pairing) thereof. According to an embodiment, the electronic pen 510, which may be disposed in the electronic device 400, may cause the electronic device 400 to generate events when the electronic pen 510 is mounted (attached) on, or detached from, the electronic device 400.

When the controller 480 detects a pairing event associated with the device 500 through the event detecting unit 481, the controller 480 may identify a function that is associated with the device 500 and the wearable device 600 in response to the pairing event. The controller 480 may display a user interface (e.g., the first user interface) related to the identified function on the display 431 of the electronic device 400. The controller 480 may transmit, to the wearable device 600, a function-executing instruction of the function and a user interface (e.g., the second user interface) related to the function in parallel to the display operation of the user interface or in sequence with respect to the same.

Although the first user interface and the second user interface are separately described in various embodiments of the present disclosure, the first user interface and the second user interface may refer to different versions of the same user interface that are available on different devices (e.g., the electronic device 400, the wearable device 600, and the device 500). The first user interface and the second user interface may be separated according to whether the corresponding user interface is implemented in the electronic device 400 or in the wearable device 600. For example, the display of the wearable device 600, which displays the user interface, may be smaller than the display 431 of the electronic device 400. Therefore, in various embodiments of the present disclosure, the second user interface may be implemented in a different form from the first user interface so as to correspond to the display size of the wearable device 600. According to an embodiment, the second user interface may be reconfigured in a simplified form compared to the first user interface by selecting only a core component (e.g., a main menu) from among various components (e.g., menus) of the first user interface, and then may be provided, as screen examples shown in the drawings (e.g., FIG. 7, FIG. 8, or FIG. 9) described later. According to an embodiment, the first user interface and the second user interface may include components related to the functions above, and the second user interface may be implemented based on at least some of the components that are implemented in the first user interface. The electronic device 400 may reconfigure the second user interface to correspond to the wearable device 600 based on the first user interface, and may provide the same.

In addition, in various embodiments of the present disclosure, the first user interface and the second user interface may be provided in a different form, respectively, according to the case where the electronic device 400 and the wearable device 600 independently execute the function without interlocking with each other or the case where the electronic device 400 and the wearable device 600 interwork with each other to execute the function.

According to various embodiments, when the event detecting unit 481 detects that a connection with a connection with the device 500 is established or terminated, the controller 480 may perform a search in order to detect whether or not a user interface {e.g., the second user interface that can be implemented in the wearable device 600 (e.g., the user interface dedicated to the wearable device 600)}, which matches the detected devices 500, exists by the function processing unit 483. For example, if the device 500 is the electronic pen 510 and the function, which can be executed by the electronic pen 510, is drawing a picture, a user interface by which the user can draw a picture by using the electronic pen 510 through the display 431 according to the function of drawing may be matched. The user interface may be divided into a portion for directly drawing a picture and a portion that is related to additional options {e.g., the component of a pen attribute (thickness, color, or the like)} necessary for the drawing.

In various embodiments of the present disclosure, in instances in which the electronic device 400 and the wearable device 600 are connected to interlock with each other, the user interface may be divided to define the first user interface that is implemented in the electronic device 400 and the second user interface that is implemented in the wearable device 600.

According to various embodiments of the present disclosure, when the pairing event associated with the electronic pen 510 is detected by the event detecting unit 481, the first user interface, which is comprised of elements necessary for directly drawing a picture through the display 431, may be implemented in the electronic device 400, and the second user interface, which is comprised of elements related to the additional options necessary for the drawing, may be provided in the wearable device 600. According to various embodiments of the present disclosure, when the display device 540 is detected, a portion of a user interface (e.g., a function execution screen display portion), which is related to the display of the executed function, may be implemented as the first user interface to then be provided by the electronic device 400, and a portion (e.g., a control portion for the execution screen display), which is related to the control of the executed function, may be implemented as the second user interface to then be provided by the wearable device 600.

According to various embodiments, the controller 480 (e.g., the function processing unit 483) may identify an available function by interworking with the wearable device 600 in response to the pairing event. If a user interface (e.g., the second user interface) related to the identified function exist, the controller 480 (e.g., function processing unit 483) may transmit, to the wearable device 600, an instruction for executing the function, and the wearable device 600 may display the second user interface, which corresponds to the function, as a result of executing the instruction.

According to various embodiments of the present disclosure, if a user interface (e.g., the second user interface), which matches the wearable device 600 (which can be implemented in the wearable device 600) in relation to the identified function, does not exist, or if no available function exists in relation to the wearable device 600, the controller 480 (e.g., the function processing unit 483) may allow the user interface to be executed by the electronic device 400 regardless of the type of user interface and may allow the electronic device to solely (independently) process the operation related to the corresponding function without the interworking.

According to various embodiments, if a user interface, which matches the wearable device 600 in relation to the identified function, does not exist, or if no available function exists in relation to the wearable device 600, the controller 480 (e.g., the function processing unit 483) may transmit a related function (e.g., an application) or a user interface (e.g., the second user interface) from the electronic device 400 or the device 500 to the wearable device 600, or may install the same in the wearable device 600. According to an embodiment, in instances in which the related function or the second user interface is pre-installed in the electronic device 400 or the device 500, the related data may be transmitted to the wearable device 600 to control the installation. According to an embodiment, in instances in which the related function or the second user interface is not pre-installed in the electronic device 400 or the device 500, the controller may download the related data from the related server (e.g., an application server, a web server, etc.) to then be transmitted to the wearable device 600, or may control the wearable device 600 to download and install the related data.

According to various embodiments, the wearable device 600 may receive the function-executing instruction for the function execution and the execution of the second user interface corresponding thereto from the electronic device 400. When the function-executing instruction is received, the wearable device 600 may display information corresponding to the function-executing instruction, and may wait for the reception of a user input (e.g., the first user input) (e.g., acceptance or rejection) corresponding thereto. If the wearable device 600 detects a user input indicating acceptance of the usage of the wearable device 600 in relation to the function, the wearable device 600 may display and provide the second user interface to the user. The user input, for example, may include a posture change input of the wearable device 600, a biometric recognition input, a button input, or a touch gesture input. According to an embodiment, the user input may be made based on an operation in which the user touches the touch screen 620 of the wearable device 600 or buttons (not shown) provided on the wearable device 600, or performs a gesture of changing (tilting) the posture of the wearable device 600 (e.g., a gesture of tiling a user's wrist in the case of a wrist-watch type of device), or a gesture of watching the camera provided in the wearable device 600.

According to various embodiments, the wearable device 600 may receive a user input (e.g., the second user input) based on the second user interface, and may transmit a functional control signal corresponding to the user input to the electronic device 400. Then, the electronic device 400 may receive the function control signal from the wearable device 600, and in response to the function control signal, may perform a function (operation) corresponding to the function control signal based on the first user interface.

As described above, according to various embodiments of the present disclosure, when the electronic device 400 and the wearable device 600 are connected with each other, the interworking function may be performed in response to the pairing event of the device 500 through the event detecting unit 481. According to various embodiments of the present disclosure, the controller 480 may detect the pairing release event associated with the device 500 through the event detecting unit 481 while performing the interworking function.

If the controller 480 detects the pairing release event associated with the device 500, the controller 480 may selectively end the running interworking function with the wearable device 600 in response to the pairing release event. For example, the controller 480 may cause wearable device 600 to end the function in progress and display of the user interface (e.g., the second user interface), which is related to the function. According to an embodiment, the controller 480 may transmit, to the wearable device 600, a function-end instruction to terminate the function and the display of the user interface (e.g., the second user interface), which is related to the function.

According to various embodiments, the electronic device 400 may transmit the function-end instruction (e.g., function termination instruction) to the wearable device 600, and may solely process the function that has been performed through the interworking with the wearable device 600. According to an embodiment, the electronic device 400 may convert the first user interface, which is being displayed, into a user interface that is integrated with the first user interface and the second user interface to then be displayed.

According to various embodiments, the wearable device 600 may receive, from the electronic device 400, the function-end instruction for the function end and the display end of the second user interface corresponding thereto. When the wearable device 600 receives the function-end instruction, the wearable device 600 may terminate the function that is in progress by the interworking with the electronic device 400, and may end the display of the second user interface, in response to the function-end instruction.

Various embodiments of the present disclosure describe an example in which the interworking function may be executed according to the pairing event associated with the device 500 while the electronic device 400 and the wearable device 600 are connected with each other, and the interworking function is terminated in the wearable device 600 according to the pairing release event associated with the device 500. However, various embodiments of the present disclosure are not limited thereto, and even with the pairing release event associated with the device 500, the interworking function between the electronic device 400 and the wearable device 600 may be maintained.

As described above, a system for the interworking between the electronic devices, according to various embodiments of the present disclosure, may include: a wearable device 600 that is connected with the electronic device 400 through a communication interface based on wired or wireless communication, and transmits a control signal corresponding to the user input to the electronic device 400; a device 500 that is connected with the electronic device 400 through a communication interface based on wired or wireless communication and generates an event corresponding to the connection with the electronic device 400 to enable the communication; and an electronic device that detects an event associated with the connection of the device 500 while being connected with the wearable device 600, determines a function that matches the device 500 in response to the event, and transmits, to the wearable device 600, an instruction for the execution of the function in the wearable device 600.

Figure 6:
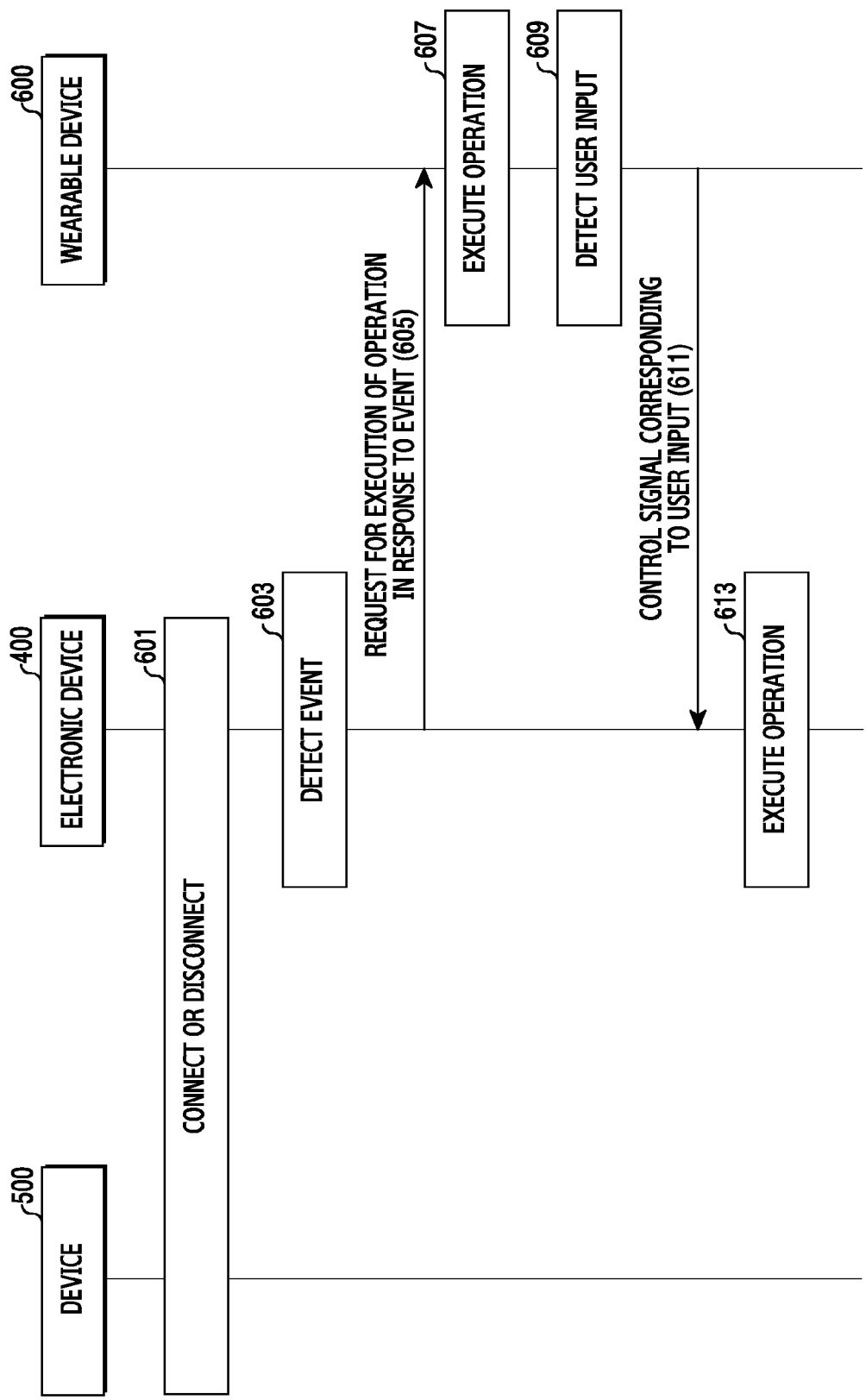
FIG. 6 is a sequence diagram of an example of a process, according to various embodiments of the present disclosure.

FIG. 6 is a sequence diagram of an example of a process, according to various embodiments of the present disclosure.

Referring to FIG. 6, in operation 601, the electronic device 400 may be connected to, or disconnected from the device 500 based on a given communication method, and in operation 603, the electronic device 400 may detect a corresponding event (e.g., the pairing event or the pairing release event) in response to the connection or disconnection of the device 500.

According to various embodiments, the electronic device 400 may detect (and/or generate) a pairing event when the electronic pen 510 is removed from the electronic device 400, and may detect (and/or generate) a pairing release event in response to the electronic pen 510 being mounted on the electronic device 400. Additionally or alternatively, the electronic device 400 may detect a pairing event in response to the connection (the communication-enabled state) of the display device 540 with the electronic device 400, and may detect a pairing release event in response to the disconnection (the communication-disabled state) of the display device 540 from the electronic device 400.

In operation 605, in response to the event associated with the device 500, the electronic device 400 may make a request to the wearable device 600 for the execution of an operation according to the event. According to various embodiments, the electronic device 400 may transmit, to the wearable device 600, an instruction to execute the corresponding function and display the user interface (e.g., the second user interface) related to the function in response to the pairing event. Alternatively, the electronic device 400 may transmit, to the wearable device 600, a function-end instruction to terminate the corresponding function and the user interface (e.g., the second user interface) related thereto in response to the pairing release event.

In operation 607, the wearable device 600 may execute the related operation in response to the operation execution request (e.g., the function-executing instruction or the function-end instruction) of the electronic device 400. For example, the wearable device 600 may execute the related function and may display the second user interface corresponding thereto in response to the function-executing instruction. Additionally or alternatively, the wearable device 600 may end the related function and the display of the second user interface corresponding thereto in response to the function-end instruction. According to an embodiment, the wearable device 600 may display a background screen or may display a function execution screen that has been previously displayed when the display of the second user interface is terminated.

In operation 609, the wearable device 600 may detect a user input. According to various embodiments of the present disclosure, it may be assumed that the user input of the operation 609 is an input for controlling the operation (function) related to the first user interface that is in progress in the electronic device 400 (and/or the device 500) while the second user interface is displayed. Thus, in instances in which the wearable device 600 ends the display of the second user interface in response to the function-end instruction, the operation 609 and the following operation 611 may be omitted.

In operation 611, a control signal corresponding to the detected user input may be transmitted to the electronic device 400. For example, the wearable device 600 may receive a user input that is applied to the first user interface in progress in the electronic device 400 based on the second user interface that is executed in response to the function-executing instruction, and may transmit a control signal according thereto to the electronic device 400.

In operation 613, the electronic device 400 may receive the control signal transmitted from the wearable device 600, and may execute the related operation in response to the control signal. For example, the electronic device 400 may apply the operation (function) corresponding to the control signal to the second user interface in progress to then display the same. The related operation executed in response to the control signal will be described in further detail with respect to FIGS. 7-10 below.

Figure 7:
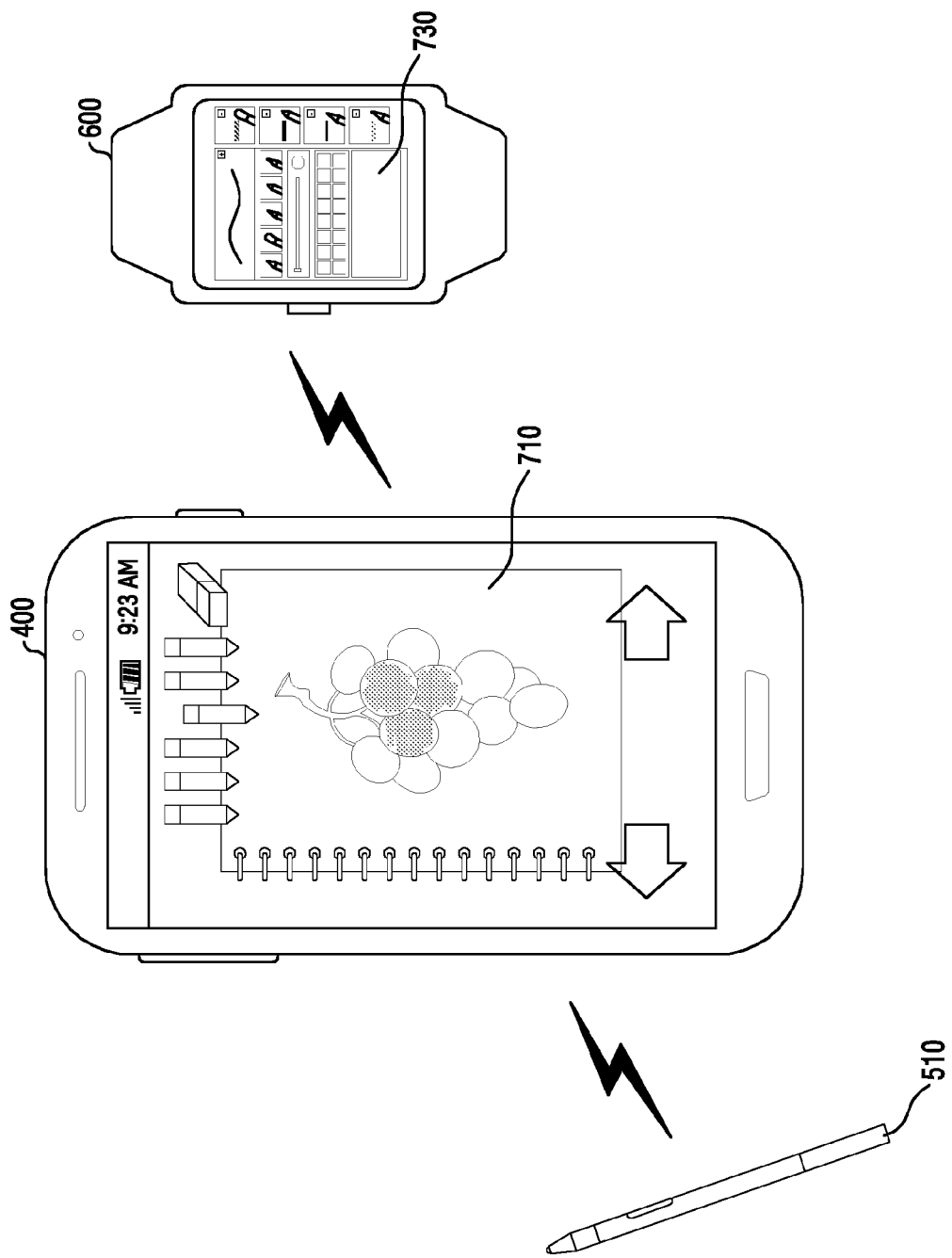
FIG. 7 is a diagram illustrating an example of the operation of a system, according to various embodiments of the present disclosure.

FIG. 7 is a diagram illustrating an example of the operation of a system, according to various embodiments of the present disclosure.

As shown in FIG. 7, FIG. 7 may show an example in which the electronic device 400 and the wearable device 600 are connected with each other, and the device 500 is the electronic pen 510. According to an embodiment, when the electronic pen 510 is detached from the electronic device 400, the electronic device 400 and the electronic pen 510 may be in a communicable state, and the electronic device 400 may detect a pairing event in response to the removal of the electronic pen 510. When the electronic device 400 detects the pairing event corresponding to the removal of the electronic pen 510, the electronic device 400 may control the execution of the user interface of the wearable device 600 in response to the pairing event.

Referring to FIG. 7, the electronic pen 510 may be provided (accepted) in a receptacle that is formed in the main body of the electronic device 400. According to various embodiments, the pairing event may occur in the electronic device 400 according to the removal of the electronic pen 510, and a function and a user interface, which match the electronic pen 510, may be executed in response to the pairing event. According to various embodiments, although the example of FIG. 7 shows that the function matching the electronic pen 510 is an image editing function and the user interface corresponding to the function is a user interface related to the editing of the image, various embodiments are possible. For example, the electronic pen 510 may be associated with various functions, such as drawing a picture, note-taking, or a gallery.

According to various embodiments, the electronic device 400 may detect the removal of the electronic pen 510 while the application for editing an image is in progress, or may detect the removal of the electronic pen 510 while another function is in progress or in the standby mode. According to various embodiments, the attachment/removal of the electronic pen 510 in the electronic device 400 may be determined based on sensed information. According to an embodiment, when the electronic pen 510 is attached to the electronic device 400, a sensing circuit related to the electronic pen 510 in the electronic device 400 may open-circuit. According to another embodiment, when the electronic pen 510 is detached from the electronic device 400, the sensing circuit related to the electronic pen 510 in the electronic device 400 may short-circuit.

According to various embodiments, the electronic device 400 may recognize the attachment of the electronic pen 510 when the sensing circuit is in the open state, and it may be defined as the communication disconnection with respect to the attachment of the electronic pen 510 in the following description. According to various embodiments, the electronic device 400 may recognize the removal of the electronic pen 510 when the sensing circuit is in the short state, and it may be defined as the communication connection with respect to the removal of the electronic pen 510 in the following description.

According to various embodiments, when an application is being executed by the electronic device 400, a user interface of the application (e.g., an integrated user interface) may be displayed on the electronic device 400, and a pairing event may occur in this state due to the electronic pen 510.

According to various embodiments, in response to detecting the pairing event, the electronic device 400 may perform a search in order to identify whether or not a user interface (e.g., the second user interface 730) dedicated to the wearable device 600, which matches the electronic pen 510, exists. For example, when the application for editing an image is in progress in the electronic device 400, a user interface (e.g., the second user interface 730) for determining the attribute of a pen may exist in the wearable device 600, and the electronic device 400 may identify whether or not a user interface corresponding thereto exists.

According to various embodiments, the electronic device 400 may convert the user interface (e.g., the integrated user interface) related to the application, which is being displayed, into the first user interface 710 to then be displayed concurrently with searching for the user interface (e.g., the second user interface 730) dedicated to the wearable device 600 or in sequence with respect to the same.

According to various embodiments, a pairing event associated with the electronic pen 510 may occur while the electronic device 400 executes another function or is in the standby mode. According to various embodiments, in response to detecting the pairing event, the electronic device 400 may perform an operation of converting the user interface, which is being displayed according to the execution of another function, into the first user interface 710 to then be displayed, or an operation of turning on the display 431 in the standby mode and displaying the first user interface 710 in parallel to the operation of searching for the user interface (e.g., the second user interface 730) dedicated to the wearable device 600, which matches the electronic pen 510, or in sequence with respect to the same.

According to various embodiments, if the user interface (e.g., the second user interface 730) dedicated to the wearable device 600 exists, the electronic device 400 may transmit a function-executing instruction for the execution of the second user interface 730 to the wearable device 600.

According to various embodiments, the wearable device 600 may receive the function-executing instruction, and may wait for a user input. According to an embodiment, when the function-executing instruction is received, the wearable device 600 may output (e.g., displaying, vibration, alarm, etc.) information associated with the function-executing instruction (e.g., execution identifying information of the second user interface 730), and may wait to receive the first user input (e.g., a configured gesture input corresponding to the acceptance or rejection, a physical button input for the acceptance or rejection, a software-based button input for the acceptance or rejection, or the like), which corresponds thereto. In various embodiments of the present disclosure, the operation of waiting for the first user input may be omitted. For example, when the wearable device 600 receives the function-executing instruction, the wearable device 600 may directly execute and display the second user interface 730 in response to the function-executing instruction without waiting for the first user input.

In various embodiments of the present disclosure, the electronic device 400 and the wearable device 600 may perform a data communication operation, such as a request for the related information (e.g., the attribute of a pen) necessary for the provision of the second user interface 730 and the reception thereof in response to the first user input or the direct execution of the second user interface 730.

According to various embodiments, if the execution of the second user interface 730 is accepted by the user, the wearable device 600 may execute and display the second user interface 730 (e.g., a user interface for determining the attribute of a pen). According to various embodiments, in instances in which the second user interface 730 is in progress by the interworking between the wearable device 600 and the electronic device 400, the operation above may be omitted.

According to various embodiments, when the wearable device 600 receives the second user input from the user while the second user interface 730 is displayed, the wearable device 600 may execute the related operation. According to an embodiment, when a specific attribute of a pen to be applied to the first user interface 710 is selected through the second user interface 730, the wearable device 600 may transmit, to the electronic device 400, a control signal to instruct the application to the first user interface 710 based on the selected and specific attribute of a pen.

According to various embodiments, the electronic device 400 may apply the specific attribute of a pen to the first user interface 710 in response to the control signal and may display the same.

Figure 8:
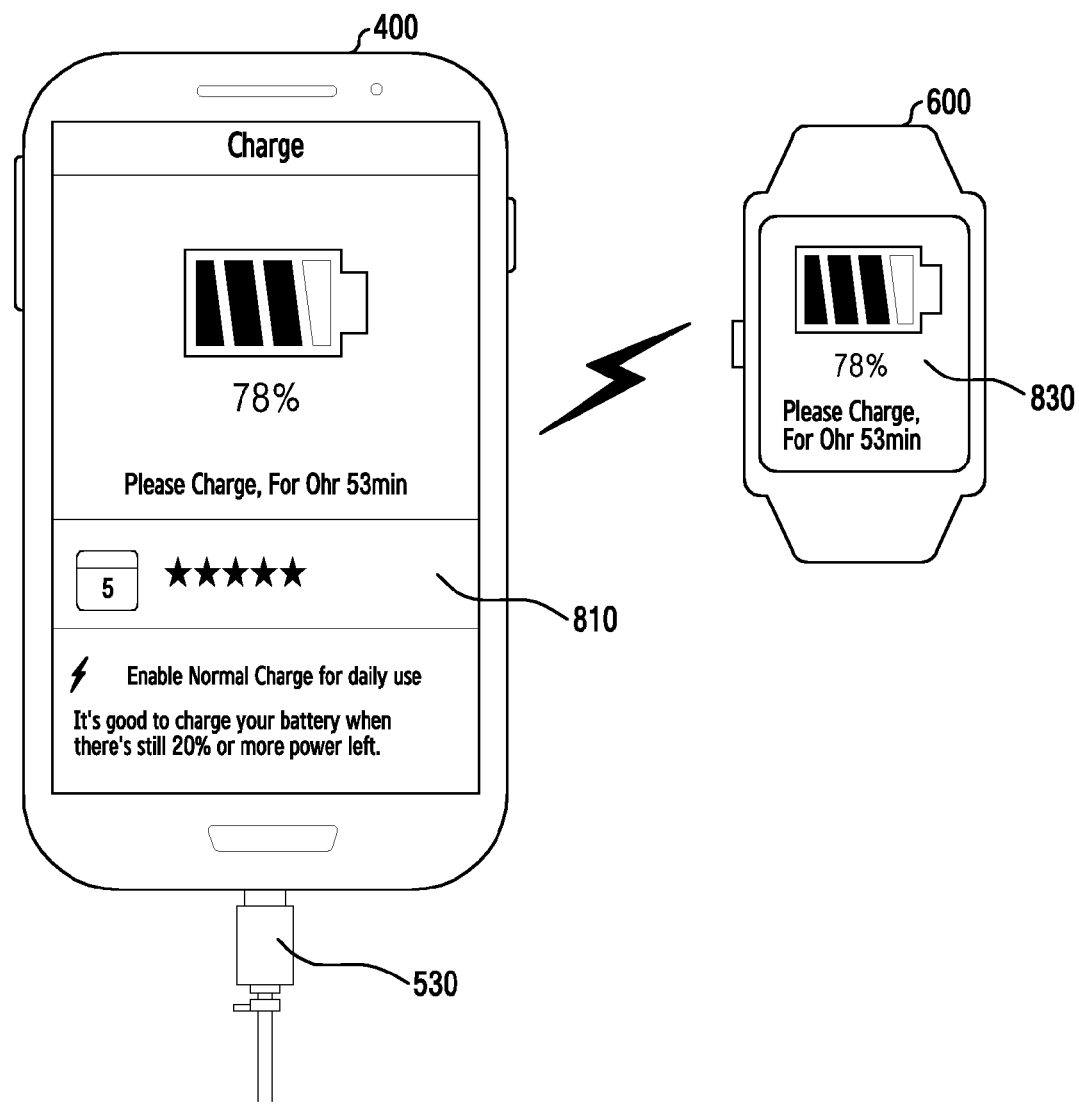
FIG. 8 is a diagram illustrating an example of the operation of a system, according to various embodiments of the present disclosure.

FIG. 8 is a diagram illustrating an example of the operation of a system, according to various embodiments of the present disclosure.

As shown in the FIG. 8, FIG. 8 may show an example in which the electronic device 400 and the wearable device 600 are connected with each other, and the device 500 is the charger 530. According to an embodiment, when the charger 530 is connected (inserted) through a data connector of the electronic device 400, the electronic device 400 and the charger 530 may be in a communicable state, and the electronic device 400 may detect a pairing event in response to the connection of the charger 530. When the electronic device 400 detects the pairing event indicating that the charger 530 is connected to the electronic device 400, the electronic device 400 may control the execution of the user interface of the wearable device 600 in response to the pairing event.

Referring to FIG. 8, the event may occur in the electronic device 400 in response to the charger 530 being connected, and a function and a user interface, which match the charger 530, may be executed in response to the event. According to various embodiments, although the example of FIG. 8 shows that the function matching the charger 530 is a charging function and the user interface corresponding thereto is a user interface related to the charging, various embodiments are possible.

According to various embodiments, the electronic device 400 may detect the connection of the charger 530 while another function is in progress or in the standby mode. The electronic device 400 may detect a pairing event in response to the connection of the charger 530.

According to various embodiments, in response to the pairing event, the electronic device 400 may perform a search in order to identify whether or not a user interface dedicated to the wearable device 600, which matches the charger 530, exists. For example, when the charging function is in progress in the electronic device 400, a user interface (e.g., the second user interface 830) for providing an indication of charging status may exist in the wearable device 600, and the electronic device 400 may identify whether or not a user interface corresponding thereto exists.

According to various embodiments, the electronic device 400 may perform an operation of converting the user interface, which is being displayed according to the execution of another function, into the first user interface 810 related to the charging function to then be displayed, or an operation of turning on the display 431 in the standby mode and displaying the first user interface 810 related to the charging function in parallel to the operation of searching for the user interface (e.g., the second user interface 830) dedicated to the wearable device 600 or in sequence with respect to the same.

According to various embodiments, if the user interface (e.g., the second user interface 830) dedicated to the wearable device 600 exists, the electronic device 400 may transmit to the wearable device 600 a function-executing instruction for executing the second user interface 830.

According to various embodiments, the wearable device 600 may: receive the function-executing instruction; output (e.g., displaying, vibration, alarm, etc.) the information on the function-executing instruction; and wait to receive the first user input for determining the execution of the second user interface 830 according to the function-executing instruction. In various embodiments of the present disclosure, the operation of waiting for the first user input may be omitted. For example, when the wearable device 600 receives the function-executing instruction, the wearable device 600 may directly execute and display the second user interface 830 in response to the function-executing instruction without waiting for the first user input.

In various embodiments of the present disclosure, the electronic device 400 and the wearable device 600 may perform a data communication operation, such as a request for the related information (e.g., the charging amount of a battery of the electronic device 400) necessary for the provision of the second user interface 830 and the reception thereof in response to the first user input or the direct execution of the second user interface 830.

According to various embodiments, if the execution of the second user interface 830 is accepted by the user, the wearable device 600 may execute and display the second user interface 830 (e.g., a user interface capable of displaying the charging status). In various embodiments, the wearable device 600 may display the current charging status of the electronic device 400, or additionally or alternatively, may display the charging status of the electronic device 400 and the charging status of the wearable device 600 together.

Figure 9:
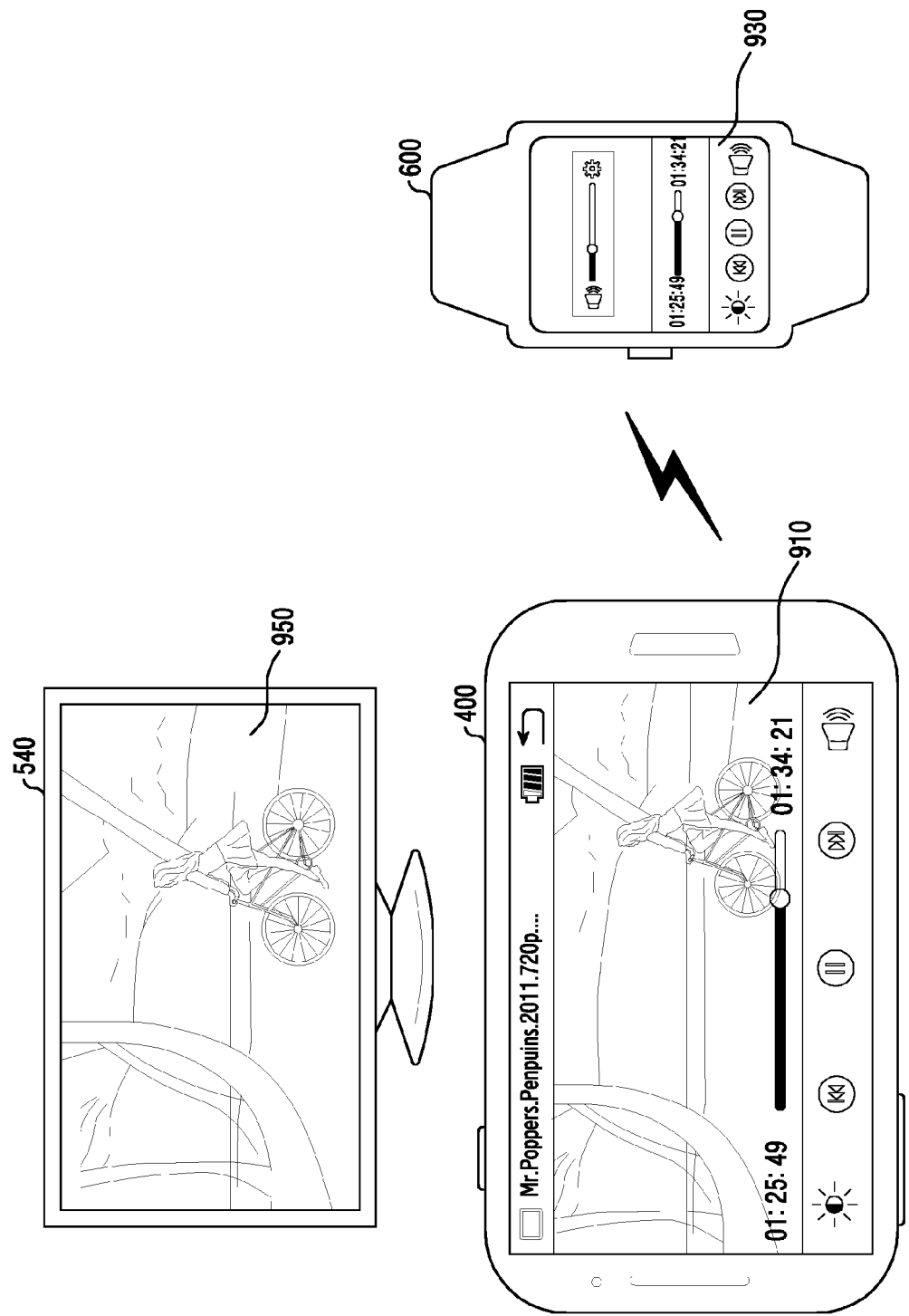
FIG. 9 is a diagram illustrating an example of the operation of a system, according to various embodiments of the present disclosure.

FIG. 9 is a diagram illustrating an example of the operation of a system, according to various embodiments of the present disclosure.

More particularly, FIG. 9 shows an example in which the electronic device 400 and the wearable device 600 are connected with each other, and the device 500 is the display device 540. According to an embodiment, when the display device 540 is connected to the electronic device 400, the electronic device 400 and the display device 540 may be in a communicable state, and the electronic device 400 may detect a pairing event in response to the connection with the display device 540 being established.

When the electronic device 400 detects the pairing event indicating that the connection with the display device 540 is established, the electronic device 400 may control the execution of the user interface of the wearable device 600 in response to the pairing event.

Referring to FIG. 9, the electronic device 400 may be connected with the display device 540 through a screen transmitting function (e.g., a mirroring function). According to various embodiments, a pairing event may occur in the electronic device 400 according to the connection of the display device 540, and a function and a user interface, which match the display device 540, may be executed in response to the pairing event. According to various embodiments, although the example of FIG. 9 shows that the function matching the display device 540 is a reproduction-related control function and the user interface corresponding thereto is a user interface related to the control of content (e.g., videos), which is reproduced, various embodiments are possible.

According to various embodiments, the electronic device 400 may detect that a connection is established with the display device 540 while the application for reproducing content is being executed or may detect the connection of the display device 540 while another function is in progress or in the standby mode.

According to various embodiments, when an application is in progress in the electronic device 400, a user interface (e.g., an integrated user interface), which is related to the application, may be displayed on the electronic device 400, and the pairing event may occur in this state due to the display device 540.

According to various embodiments, in response to the pairing event, the electronic device 400 may perform a search in order to identify whether or not a user interface (e.g., the second user interface 930) dedicated to the wearable device 600, which matches the display device 540, exists. For example, when a media player is executed by the electronic device 400, a user interface (e.g., the second user interface 930) for performing the video reproduction control or the volume control may exist in the wearable device 600, and the electronic device 400 may identify whether or not a corresponding user interface exists.

According to various embodiments, the electronic device 400 may convert the user interface (e.g., the integrated user interface), which is related to the displayed application, into the first user interface 910 (e.g., that includes a reproduction control-related interface in FIG. 9) and displaying the same, and an operation of transmitting, to the display device 540, the third user interface 950 (e.g., a video reproduction screen without the control-related interface in FIG. 9) of the electronic device 400 according to a screen transmission function (e.g., the mirroring function) in parallel to the operation of searching for the user interface (e.g., the second user interface 930) dedicated to the wearable device 600 or in sequence with respect to the same. In various embodiments of the present disclosure, the electronic device 400 may provide a user interface (e.g., a user interface that does not contain a reproduction control-related interface), which is the same or similar to the user interface (e.g., the third user interface 950) provided in the display device 540 instead of providing the first user interface 910.

According to various embodiments, the pairing event associated with the display device 540 may occur while the electronic device 400 executes another function or is in the standby mode. According to various embodiments, the electronic device 400, in response to detecting the pairing event, may: convert the user interface, which is being displayed according to the execution of another function, into the first user interface 910 to then be displayed; or an operation of turning on the display 431 in the standby mode and displaying the first user interface 910; and an operation of displaying (e.g., the mirroring function) the third user input 950 on the display device 540 in parallel to the operation of searching for the user interface (e.g., the second user interface 930) dedicated to the wearable device 600, which matches the display device 540, or in sequence with respect to the same.

According to various embodiments, if the user interface (e.g., the second user interface 930) dedicated to the wearable device 600 exists, the electronic device 400 may transmit a function-executing instruction for the execution of the second user interface 930 to the wearable device 600.

According to various embodiments, the wearable device 600 may receive the function-executing instruction and may begin waiting for a user input. According to an embodiment, when the wearable device 600 receives the function-executing instruction, the wearable device 600 may output (e.g., displaying, vibration, alarm, etc.) information associated with the function-executing instruction (e.g., execution identifying information on the second user interface 930), and may wait for the reception of the first user input corresponding thereto. In various embodiments of the present disclosure, the operation of waiting for the first user input may be omitted. For example, when the wearable device 600 receives the function-executing instruction, the wearable device 600 may directly execute and display the second user interface 930 in response to the function-executing instruction without waiting for the first user input.

In various embodiments, the electronic device 400 and the wearable device 600 may perform a data communication operation, such as making a request for the related information (e.g., a reproduction/volume-related function control signal) necessary for the provision of the second user interface 930 and the reception thereof in response to the first user input or the direct execution of the second user interface 930.

According to various embodiments, if the execution of the second user interface 930 is accepted by the user, the wearable device 600 may execute and display the second user interface 930 (e.g., a user interface capable of performing the video reproduction control or the volume control). In various embodiments, in instances in which the second user interface 930 is in progress by the interworking between the wearable device 600 and the electronic device 400, the operation above may be omitted.

According to various embodiments, when the second user input is received while the second user interface 930 is displayed, the wearable device 600 may execute the related operation. According to an embodiment, a specific control function to control the first user interface 910 (or the third user interface 950) is selected through the second user interface 930, the wearable device 600 may transmit, to the electronic device 400, a control signal to instruct the application thereof to the first user interface 910 (or the third user interface 950) based on the selected specific control function.

According to various embodiments, the electronic device 400 may apply the specific control function to the first user interface 910 and the third user interface 950 and may provide the same in response to the control signal. According to an embodiment, the electronic device 400 may control the volume of the video that is produced, or may fast forward or rewind the video.

Figure 10:
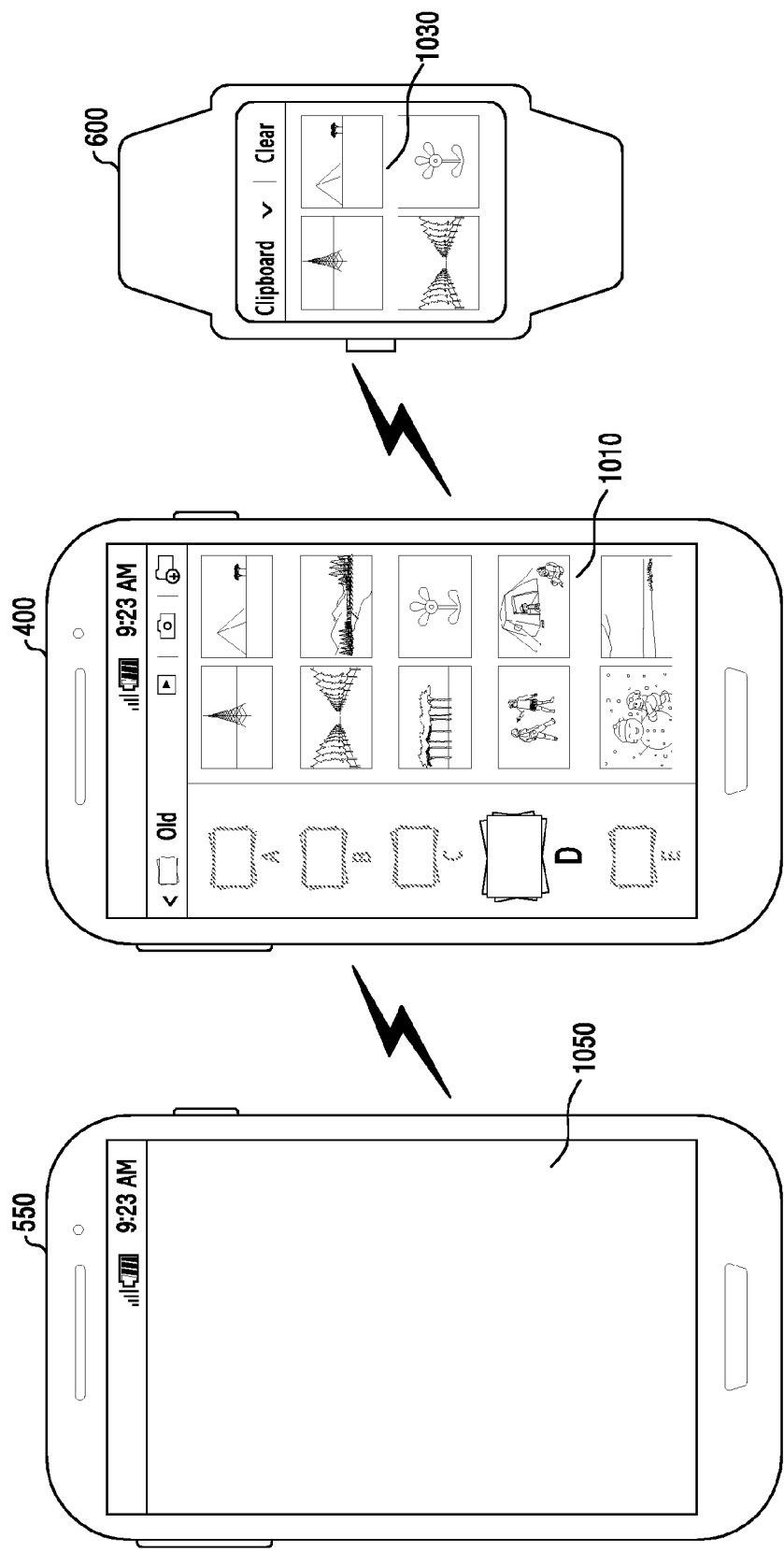
FIG. 10 is a diagram illustrating an example of the operation of a system, according to various embodiments of the present disclosure.

FIG. 10 is a diagram illustrating an example of the operation of a system, according to various embodiments of the present disclosure. More particularly, FIG. 10 shows an example in which the electronic device 400 and the wearable device 600 are connected with each other, and the device 500 is the other electronic device 550. According to an embodiment, when the other electronic device 550 is connected to the electronic device 400, the electronic device 400 and the other electronic device 550 may be in a communicable state, and the electronic device 400 may detect a pairing event in response to the connection of the other electronic device 550. When the electronic device 400 detects the pairing event corresponding to the connection of the other electronic device 550, the electronic device 400 may control the execution of the user interface of the wearable device 600 in response to the pairing event.

Referring to FIG. 10, the connection of the electronic device 400 and the other electronic device 550 for the transmission of content or files may be established wirelessly and/or over a wired medium. According to various embodiments, a pairing event may occur in the electronic device 400 according to the connection of the other electronic device 550, and a function and a user interface, which match the other electronic device 550, may be executed in response to the pairing event. According to various embodiments, although the example of FIG. 10 shows that the function matching the other electronic device 550 is a file transfer function and the user interface corresponding thereto is a user interface related to the operation of transferring the files, various embodiments are possible.

According to various embodiments, the electronic device 400 may detect the connection of the other electronic device 550 while a gallery application (e.g., an image viewer) is being executed or may detect the connection of the other electronic device 550 while another function is in progress or in the standby mode.

According to various embodiments, when an application is in progress in the electronic device 400, a user interface (e.g., the first user interface 1010), which is related to the application, may be displayed in the electronic device 400, and the pairing event by the other electronic device 550 may occur in this state.

According to various embodiments, in response to the pairing event, the electronic device 400 may perform a search in order to identify whether or not a user interface (e.g., the second user interface 1030) (e.g., a clipboard application-related user interface) dedicated to the wearable device 600, which matches the other electronic device 550, exists. For example, when the file transfer function is in progress in the electronic device 400, a user interface (e.g., the second user interface 1030), which is related to the clipboard application that is configured to temporarily store the transmitted files, may exist in the wearable device 600, and the electronic device 400 may identify whether or not a user interface corresponding thereto exists. The electronic device 400 may further convert the user interface, which is related to the displayed application, into the first user interface 1010 and displaying the same in parallel to the operation of searching for the user interface (e.g., the second user interface 1030) that is dedicated to the wearable device 600 or in sequence with respect to the same.

According to various embodiments, while the electronic device 400 executes another function or is in the standby mode, the pairing event by the other electronic device 550 may occur. According to various embodiments, the electronic device 400, in response to detecting the pairing event, may convert the user interface, which is being displayed according to the execution of another function, into the first user interface 1010 to then be displayed, or an operation of turning on the display 431 in the standby mode and displaying the first user interface 1010 concurrently with searching for the user interface (e.g., the second user interface 1030) dedicated to the wearable device 600, which matches the other electronic device 550, or in sequence with respect to the same.

According to various embodiments, if the user interface (e.g., the second user interface 1030) dedicated to the wearable device 600 exists, the electronic device 400 may transmit a function-executing instruction for the execution of the second user interface 1030 to the wearable device 600.

According to various embodiments, the wearable device 600 may receive the function-executing instruction and may wait for a user input. According to an embodiment, when the wearable device 600 receives the function-executing instruction, the wearable device 600 may output (e.g., displaying, vibration, alarm, etc.) the information on the function-executing instruction (e.g., execution identifying information on the second user interface 1030), and may wait for the reception of the first user input corresponding thereto (e.g., a configured gesture input corresponding to the acceptance or rejection, a physical button input for the acceptance or rejection, a software-based button input for the acceptance or rejection, or the like). In various embodiments of the present disclosure, the operation of waiting for the first user input may be omitted. For example, when the wearable device 600 receives the function-executing instruction, the wearable device 600 may directly execute and display the second user interface 1030 in response to the function-executing instruction without waiting for the first user input.

In various embodiments, the electronic device 400 and the wearable device 600 may perform a data communication operation, such as making a request for the related information (e.g., files selected for the file transfer) necessary for the provision of the second user interface 1030 and the reception thereof in response to the first user input or the direct execution of the second user interface 1030.

According to various embodiments, if the execution of the second user interface 1030 is accepted by the user, the wearable device 600 may execute and display the second user interface 1030 (e.g., a user interface capable of displaying a clipboard area, which is selected for the file transfer and temporarily stores the same, and controlling the same). In various embodiments, in instances in which the second user interface 1030 is in progress by the interworking between the wearable device 600 and the electronic device 400, the operation above may be omitted.

According to various embodiments, when the second user input is received while the second user interface 1030 is displayed, the wearable device 600 may execute the related operation. According to an embodiment, the wearable device 600 may transmit, to the electronic device 400, a control signal to instruct the files of the clipboard to be transferred to the other electronic device 550 through a second user interface 1030 or to instruct at least some of the files of the clipboard to be selected or deleted.

According to various embodiments, the electronic device 400 may perform various operations, such as transferring the files to the other electronic device 550, selecting the files, or deleting the selected files, in response to the control signal.

According to various embodiments, the other electronic device 550 may display the user interface related to the file transfer function through the display 1050 when the other electronic device 550 is connected with the electronic device 400, or may display the user interface related to the progress status through the display 1050 in response to the initiation of the file transfer of the electronic device 400.

Figure 11:
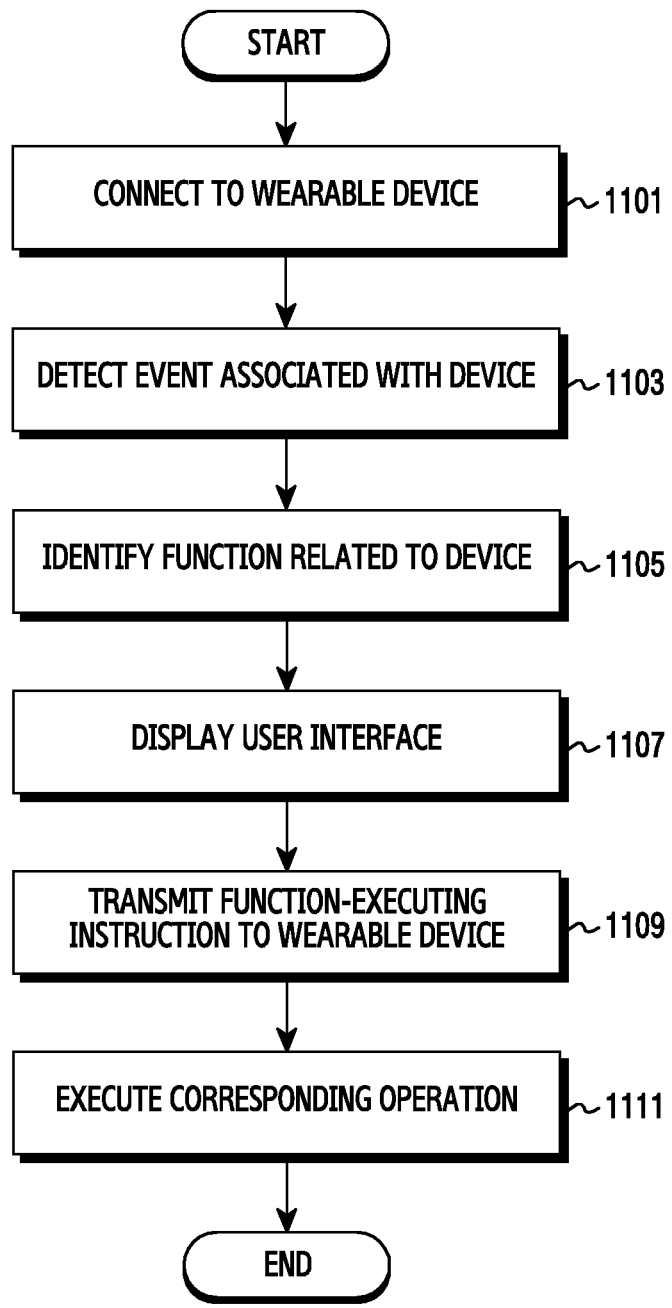
FIG. 11 is a flowchart of an example of a process, according to various embodiments of the present disclosure.

FIG. 11 is a flowchart of an example of a process, according to various embodiments of the present disclosure.

Referring to FIG. 11, in operation 1101, the controller 480 may be connected with the wearable device 600 based on a configured communication scheme.

In operation 1103, the controller 480 may detect an event associated with the device 500. According to various embodiments, the controller 480 may detect a pairing event when the device 500 is connected to the electronic device 400.

Alternatively, when the connection with the device 500 in the connection is terminated, the controller 480 may detect a pairing release event.

In operation 1105, the controller 480 may identify a function related to the device 500 in response to the event detection. According to various embodiments, the controller 480 may identify the type of device 500, and may determine the executable function according to the type of device 500. In various embodiments of the present disclosure, when the controller 480 determines a function that can be performed together with the device 500, the controller 480 may determine whether or not the function can be performed by the interworking with the wearable device 600 as well. According to various embodiments, the controller 480 may determine whether or not a user interface dedicated to the wearable device 600, which matches the function that can be performed by the device 500, exists.

In operation 1107, the controller 480 may display the user interface (e.g., the first user interface), which is related to the function that can be performed by the device 500

In operation 1109, the controller 480 may transmit a function-executing instruction corresponding to the function to the wearable device 600. According to various embodiments, the controller 480 may transmit, to the wearable device 600, the function-executing instruction for performing the interworking function with the wearable device 600 in response to the event associated with the device 500. In various embodiments, the function-executing instruction may include an instruction for causing the wearable device 600 to execute the related function and to output a user interface (e.g., the second user interface) corresponding to the related function, in response to the event.

In operation 1111, the controller 480 may execute the corresponding operation. According to various embodiments, after transmitting the function-executing instruction to the wearable device 600, the controller 480 may control the interworking function that is in progress with the device 500 in response to the control signal received from the wearable device 600.

Figure 12:
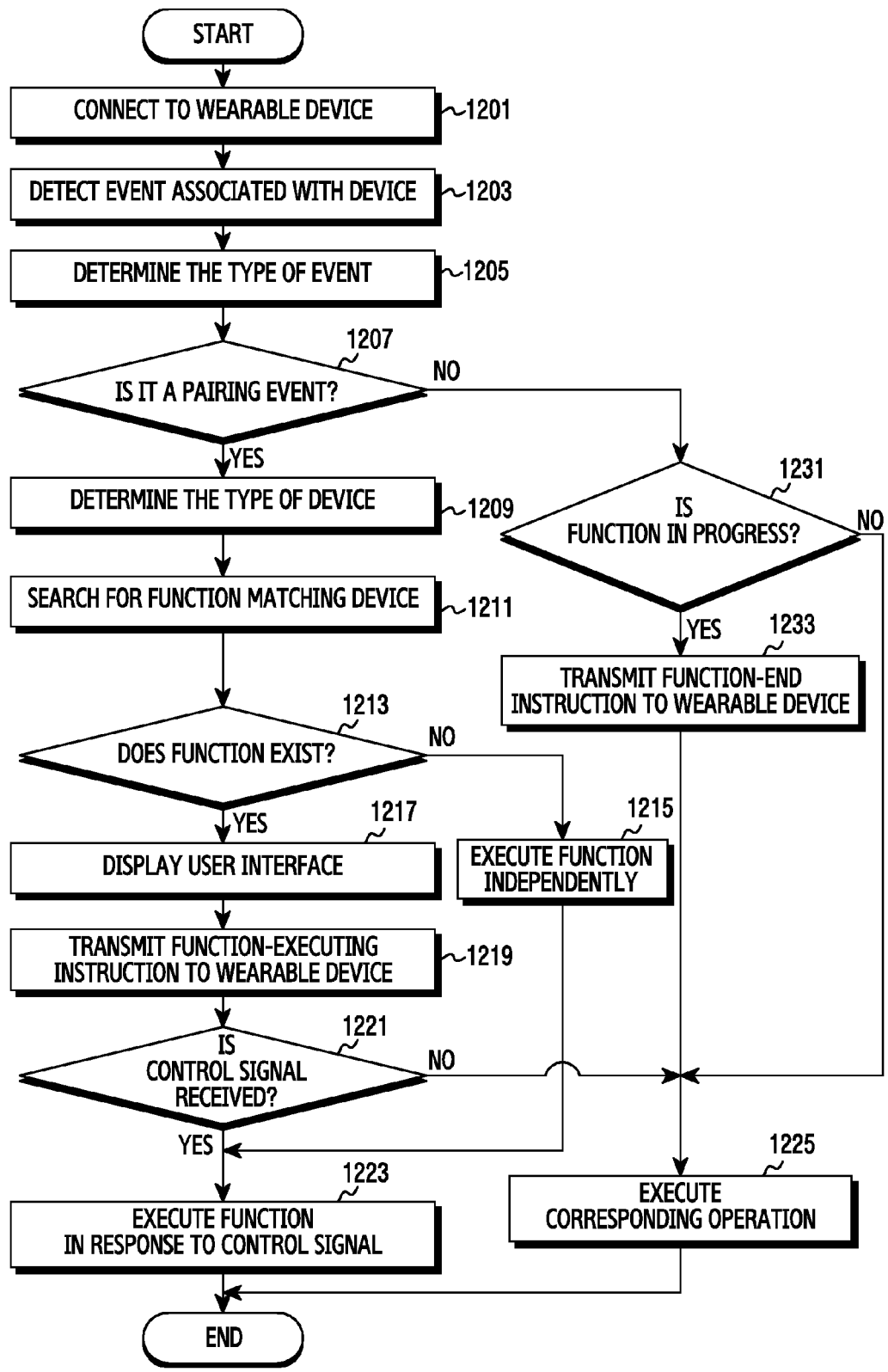
FIG. 12 is a flowchart of an example of a process, according to various embodiments of the present disclosure.

FIG. 12 is a flowchart of an example of a process, according to various embodiments of the present disclosure.

Referring to FIG. 12, in operation 1201, the controller 480 may be connected to the wearable device 600.

In operation 1203, the controller 480 may detect an event associated with the device 500. For example, the controller 480 may detect the event in response to the connection of the device 500 with the electronic device 400 to be communicable, or the disconnection of the device 500 to disable the communication.

In operation 1205, when the controller 480 detects the event, the controller 480 may determine the type of event to correspond to the connection or disconnection of the device 500, and in operation 1207, the controller 480 may determine whether the event is a pairing event or a pairing release event based on the determination result.

If the controller 480 determines that the event is a pairing event in operation 1207 ("YES" in operation 1207), the controller 480 may determine the type of device 500 that is connected to the electronic device 400 in operation 1209.

If the controller 480 determines the type of device 500, the controller 480 may perform a search for a configured function that can be associated with the device 500 (a matching function) in operation 1211, and the controller 480 may determine whether or not the corresponding function exists in operation 1213. According to various embodiments, the controller 480 may determine whether or not a function, which can be executed by the interworking with the device 500, or a function, which is predetermined as an interworking function with the device 500, exists.

If the controller 480 determines that there is no matching function in operation 1213 ("NO" in operation 1213), the controller 480 may cause the electronic device 400 to solely (independently) execute the function in operation 1215. For example, the controller 480 may cause the electronic device 400 to independently execute the function rather than executing the function in cooperation with the wearable device 600. According to other embodiments, if the controller 480 determines that there is no matching function in operation 1213 ("NO" in operation 1213), the controller 480 may provide the wearable device 500 with information by which a function, which can be executed by the interworking with the device 500, may be obtained (installed). For example, the controller 480 may provide an application installation URL address, which is related to the function that matches the device 500, in the form of a pop-up window or other UIs.

If the controller 480 determines that there is a matching function in operation 1213 ("YES" in operation 1213), a user interface (e.g., the first user interface), which is related to the function that matches the device 500, may be displayed in operation 1217.

In operation 1219, the controller 480 may transmit a function-executing instruction corresponding to the function to the wearable device 600. According to various embodiments, the controller 480, in response to the event associated with the device 500, may cause the wearable device 600 to execute the related function corresponding to the function and to display a user interface (e.g., the second user interface) corresponding to the related function.

In operation 1221, the controller 480 may determine whether or not a control signal is received from the wearable device 600. According to various embodiments, after transmitting the function-executing instruction, the controller 480 may wait to receive a control signal that is related to the function that is executed by the wearable device 600 by the interworking with the device 500, and the wearable device 600 may transmit the control signal to the electronic device 400 in response to a user input.

If the control signal is received from the wearable device 600 in operation 1221 ("YES" in operation 1221), the controller 480 may execute the function in response to the received control signal in operation 1223. In various embodiments of the present disclosure, the controller 480 may process the control (e.g., the function control operations according to the examples of FIG. 7 to FIG. 10) corresponding to the control signal in the function that is in progress by the interworking with the device 500.

If the control signal is not received from the wearable device 600 in operation 1221 ("NO" in operation 1221), the controller 480 may execute the corresponding operation in operation 1225. According to various embodiments, the controller 480 may continue to process the function that is in progress by the interworking with the connected device 500 while waiting for a control signal received from the wearable device 600.

If the controller 480 determines that the event is the pairing release event in operation 1207 ("NO" in operation 1207), the controller 480 may detect whether or not a function is in progress by the interworking with the wearable device 600 in operation 1231.

If the controller 480 determines that the function is in progress by the interworking in operation 1231 ("YES" in operation 1231), the controller 480 may transmit a function-end instruction to the wearable device 600 in operation 1233. According to various embodiments, the controller 480 may cause the wearable device 600 to terminate the function in progress and to end the display of the user interface (e.g., the second user interface) corresponding to the function.

After transmitting the function-end instruction, the controller 480 may execute the corresponding operation in operation 1225. According to various embodiments, the controller 480 may: terminate the function in progress by the interworking with the device 500; hide the user interface (e.g., the first user interface), which is displayed, according thereto; and switch to another user interface {e.g., the user interface (the home screen user interface), which is related to the function that is previously performed} to then be displayed.

If the controller 480 determines that the function is not in progress by the interworking in operation 1231 ("NO" in operation 1231), the controller 480 may execute the corresponding operation in operation 1225. According to various embodiments, the controller 480 may terminate the function that is in progress by the interworking with the device 500, and thus may convert the user input to then be displayed.

Figure 13:
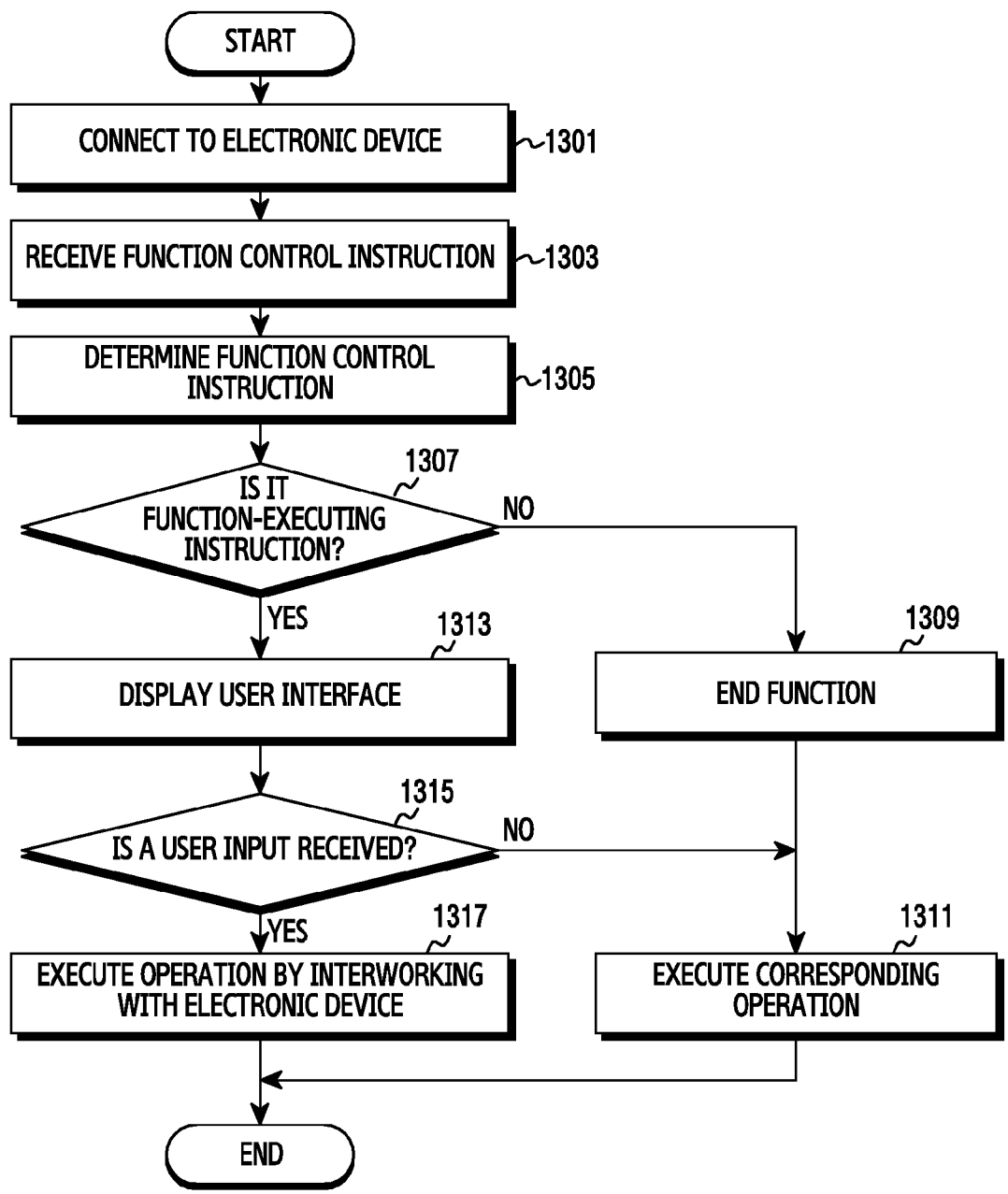
FIG. 13 is a flowchart of an example of a process, according to various embodiments of the present disclosure.

FIG. 13 is a flowchart of an example of a process, according to various embodiments of the present disclosure.

Referring to FIG. 13, in operation 1301, the controller 630 of the wearable device 600 may be connected with the electronic device 400 based on a configured communication scheme.

In operation 1303, the controller 630 may receive a function control instruction from the electronic device 400 while it is connected with the electronic device 400.

If the function control instruction is received, the controller 630 may determine the received function control instruction in operation 1305, and the controller 630 may determine whether the function control instruction is a function-executing instruction (e.g., an instruction for executing the function) or a function-end instruction (e.g., an instruction for terminating the function) based on the determination result in operation 1307.

If the controller 630 determines that the function control instruction is a function-end instruction in operation 1307 ("NO" in operation 1307), the controller 630 may terminate the function that is in progress by the interworking with the electronic device 400 in response to the function-end instruction in operation 1309.

After terminating the function, the controller 630 may execute the corresponding operation in operation 1311. According to various embodiments, the controller 630, in response to the function-end instruction, may convert the user interface (e.g., the second user interface) into another user input to then be displayed upon the termination of the function, or may turn off the display unit upon the termination of the function.

If the controller 630 determines that the function control instruction is a function-executing instruction in operation 1307 ("YES" in operation 1307), the controller 630 may display a user interface (e.g., the second user interface) in operation 1313. According to various embodiments, the controller 630 may execute a related function corresponding to the function-executing instruction, and may display a user interface (e.g., the second user interface) corresponding to the related function.

In operation 1315, the controller 630 may determine whether or not a user input is received based on the user interface. According to various embodiments, after displaying the user input, the controller 680 may receive a user input to control the function that is in progress by the interworking between the electronic device 400 and the device 500 through the user interface.

If the user input is not received in operation 1315 ("NO" in operation 1315), the controller 630 may execute the corresponding operation in operation 1311. According to various embodiments, the controller 630 may wait for a user input while continuing to display the user interface. In addition, if the user input is not received within a predetermined time period, the controller 630 may control to turn off the display unit.

If the user input is received in operation 1315 ("YES" in operation 1315), the controller 630 may execute the operation by the interworking with the electronic device 400 in operation 1317. According to various embodiments, when the user input is received, the controller 630 may determine a function corresponding to the user input, and may transmit a control signal corresponding to the determined function to the electronic device 400. In addition, the controller 630 may apply the related component to the user interface to then be displayed in response to the user input.

Meanwhile, although it is not shown in FIG. 13, according to various embodiments of the present disclosure, when the function-executing instruction is received from the electronic device 400, the controller 630 of the wearable device 600 may output information that is related to the function-executing instruction. For example, the controller 630 may provide the user with the feedback based on at least some of the display, the vibration, or the alarm with respect to the reception of the function-executing instruction. The controller 630, in response to the information output in relation to the function-executing instruction, may receive a user input {e.g., the first user input (e.g., an input corresponding to the acceptance or rejection of the function execution)}, and may perform an operation of displaying the user interface in response to the user input.

As described above, an operating method of an electronic device 400, according to various embodiments of the present disclosure, may include: detecting an event by a connection of a device 500 while being connected with a wearable device 600; determining the type of device 500, which is related to the event; determining a function of the wearable device 600, which matches the type of device 500; and transmitting, to the wearable device 600, an executing instruction for executing the function in the wearable device 600.

As described above, an operating method of a wearable device 600, according to various embodiments of the present disclosure, may include: receiving an executing instruction from a connected electronic device 400; executing a function corresponding to the executing instruction and displaying a related user interface (e.g., the second user interface); receiving a user input through the user interface; and transmitting a control signal related to the user input to the electronic device 400. In various embodiments of the present disclosure, the user input may include an input (e.g., the second user input), which is received through the user interface (e.g., the second user interface that is displayed on the wearable device 600) in relation to the control of the operation or function of the electronic device 400.

As described above, an interworking method of electronic devices, according to various embodiments of the present disclosure, may include: performing a connection between an electronic device 400 and a wearable device 600; detecting an event associated with a connection of a device 500 in the electronic device 400; displaying the first user interface that is related to a function that matches the device 500 in the electronic device 400, and transmitting an executing instruction corresponding to the function to the wearable device 600; displaying the second user interface that is related to the function in response to the reception of the executing instruction in the wearable device 600; transmitting, to the electronic device 400, a control signal corresponding to the user input received based on the second user interface in the wearable device 600; and executing an operation related to the function by the interworking with the device 500 in response to the receipt of the control signal in the electronic device 400.

The electronic device and the method thereof, according to various embodiments of the present disclosure, may execute the operation related to the event by the interworking with the wearable device connected with the electronic device in response to the event of the connection or disconnect of the device in the electronic device.

According to various embodiments of the present disclosure, the electronic device may detect a related event when a particular device is connected or disconnected, and may determine an execution method of a function corresponding to the detected event. The electronic device may execute the function for the event by the interworking with the wearable device or may solely execute the same, based on the result of the determination operation. Accordingly, the user may use the device more easily without additional manipulation based on at least one of the electronic device or the wearable device.

According to various embodiments of the present disclosure, the user may be provided with various user experiences through the interworking of the electronic device, the device, and the wearable device, and the execution of the interworking function according thereto.

According to various embodiments of the present disclosure, an optimum environment for allowing the electronic devices to interwork with each other and executing the interworking function corresponding thereto may be implemented in order to thereby improve the user's convenience, and the usability, the convenience, the accessibility, and the competitiveness of the electronic device.

FIGS. 1-13 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:
   a memory;
   a communication unit; and
   at least one processor operatively coupled to the memory and the communication unit,
   wherein the at least one processor is configured to:
   detect that the electronic device is connected with an external device;
   in response to detecting that the electronic device is connected with the external device, identifying a function which corresponds to the external device and is performed by interworking with the external device and a wearable device, the wearable device being paired with the electronic device;
   in response to identifying the function, executing the function at the electronic device; and
   in response to identifying the function, control to transmit, to the wearable device, a signal such that the wearable device executes the function.

2. The electronic device of claim 1, wherein the communication unit includes at least one of a wired communications module or a wireless communications module.

3. The electronic device of claim 1, wherein the external device is an electronic pen,
   wherein the at least one processor is further configured to:
   determine whether the electronic device is connected with the electronic pen according to whether a sensing circuit associated with the electronic pen in the electronic device is open-circuit or short-circuit,
   wherein the function is usable for displaying attributes of the electronic device on a user interface (UI) in the wearable device.

4. The electronic device of claim 1, further comprising a display,
   wherein the external device is a display device,
   wherein the at least one processor is further configured to control to display an image being displayed on the display device,
   wherein the function is usable for displaying options to control the image on a user interface (UI) in the wearable device.

5. The electronic device of claim 1, wherein the at least one processor is further configured to:
   if detecting that the function is not available in the wearable device, provide the wearable device with information for installing the function.

6. The electronic device of claim 1, further comprising a display operatively coupled to the at least one processor,
   wherein the at least one processor is further configured to:
   if detecting that the function is available in the wearable device, control to display a first user interface (UI) that is related to the identified function; and
   execute an operation that is related to the function in response to receiving a control signal from the wearable device,
   wherein the control signal is generated based on an input on a second user interface (UI) that is displayed by the wearable device.

7. The electronic device of claim 6, wherein the first UI includes a plurality of objects for operating the external device, and the second UI includes at least one object corresponding to at least one of the plurality of objects in the first UI.

8. The electronic device of claim 1, wherein the at least one processor is further configured to transmit to the wearable device an instruction for terminating the function in response to detecting that a connection state is a disconnected state.

9. A method for use in an electronic device, comprising:
   detecting that the electronic device is connected with an external device;
   in response to detecting that the electronic device is connected with the external device, identifying a function which corresponds to the external device and is performed by interworking with the external device and a wearable device, the wearable device being paired with the electronic device;
   in response to identifying the function, executing the function at the electronic device; and
   in response to identifying the function, transmitting, to the wearable device, a signal such that the wearable device executes the function.

10. The method of claim 9, wherein the electronic device comprises a communication unit including at least one of a wired communications module or a wireless communications module.

11. The method of claim 9, wherein the external device is an electronic pen,
    wherein detecting that the electronic device is connected with the external device further comprises:
    determining whether the electronic device is connected with the electronic pen according to whether a sensing circuit associated with the electronic pen in the electronic device is open-circuit or short-circuit,
    wherein the function is usable for displaying attributes of the electronic device on a user interface (UI) in the wearable device.

12. The method of claim 9, further comprising:
displaying an image being displayed on a display device,
wherein the function is usable for displaying options to control the image on a user interface (UI) in the wearable device, and
wherein the external device is a display device.

13. The method of claim 9, further comprising:
if detecting that the function is not available in the wearable device, providing the wearable device with information for installing the function.

14. The method of claim 9, further comprising:
if detecting that the function is available in the wearable device, displaying a first user interface (UI) that is related to the function; and
executing an operation that is related to the function in response to receiving a control signal from the wearable device,
wherein the control signal is generated based on an input on a second user interface (UI) that is displayed by the wearable device.

15. The method of claim 14, wherein the first UI includes a plurality of objects for operating the external device, and the second UI includes at least one object corresponding to at least one of the plurality of objects in the first UI.

16. The method of claim 9, further comprising transmitting to the wearable device an instruction for terminating the function in response to detecting that a connection state is a disconnected state.

17. A non-transitory computer-readable storage medium storing one or more programs comprising instructions which, when executed by at least one processor, cause the at least one processor to execute the method according to claim 9.

* * * * *

UNITED STATES PATENT AND TRADEMARK OFFICE
CERTIFICATE OF CORRECTION

PATENT NO. : 9,843,662 B2
APPLICATION NO. : 15/070297
DATED : December 12, 2017
INVENTOR(S) : Joo-Sub Kim et al.

Page 1 of 1

It is certified that error appears in the above-identified patent and that said Letters Patent is hereby corrected as shown below:

In the Claims

Column 47, Claim 1, Lines 45-46 should read as follows:
--...device, identify a function...--

Column 47, Claim 1, Lines 50-51 should read as follows:
--...function, execute the function...--

Column 48, Claim 4, Lines 6-7 should read as follows:
--...device, and wherein the function...--

Signed and Sealed this
Thirteenth Day of February, 2018

Andrei Iancu
*Director of the United States Patent and Trademark Office*